(12) United States Patent
Davis et al.

(10) Patent No.: US 10,503,234 B2
(45) Date of Patent: Dec. 10, 2019

(54) CONFIGURABLE WIRELESS POWER CONTROL AND MANAGEMENT

(71) Applicant: Kortek Industries Pty Ltd., Brisbane (AU)

(72) Inventors: Barrie Davis, Sanctuary Cove (AU); Benjamin Davis, Alderley (AU)

(73) Assignee: Kortek Industries Pty Ltd, Brisbane (AU)

( * ) Notice: Subject to any disclaimer, the term of this patent is extended or adjusted under 35 U.S.C. 154(b) by 159 days.

(21) Appl. No.: 15/742,879

(22) PCT Filed: Jul. 8, 2016

(86) PCT No.: PCT/AU2016/050599
§ 371 (c)(1),
(2) Date: Jan. 8, 2018

(87) PCT Pub. No.: WO2017/004681
PCT Pub. Date: Jan. 12, 2017

(65) Prior Publication Data
US 2018/0373304 A1    Dec. 27, 2018

(30) Foreign Application Priority Data

Jul. 9, 2015    (AU) ................. 2015902721
Oct. 29, 2015   (AU) ................. 2015904432

(51) Int. Cl.
*G06F 1/00*      (2006.01)
*G06F 1/3206*   (2019.01)
*G05B 15/02*    (2006.01)
*H01H 9/56*      (2006.01)
*H01H 47/32*    (2006.01)
*G06F 1/16*      (2006.01)

(52) U.S. Cl.
CPC ........... *G06F 1/3206* (2013.01); *G05B 15/02* (2013.01); *G06F 1/1683* (2013.01); *H01H 9/56* (2013.01); *H01H 47/325* (2013.01); *G05B 2219/25187* (2013.01); *G05B 2219/2642* (2013.01); *H01H 2009/566* (2013.01)

(58) Field of Classification Search
None
See application file for complete search history.

(56) References Cited

U.S. PATENT DOCUMENTS

| | | |
|---|---|---|
| 5,838,077 A | 11/1998 | Chelcun et al. |
| 2009/0027824 A1 | 1/2009 | Allen et al. |
| 2014/0268474 A1 | 9/2014 | Steiner et al. |

FOREIGN PATENT DOCUMENTS

| | | |
|---|---|---|
| DE | 102005051762 A1 | 5/2007 |
| GB | 2284100 A | 5/1995 |

OTHER PUBLICATIONS

PCT International Search Report on International application No. PCT/AU2016/050599 to Kortek Industries Pty Ltd.

*Primary Examiner* — Nitin C Patel
(74) *Attorney, Agent, or Firm* — Martin IP Pty Ltd

(57) ABSTRACT

An electromechanical relay switching system for reducing electromagnetic or radio interference. The system includes an electromechanical relay with an energizeable coil and a microcontroller configured to synchronize energizing the coil relative to a voltage zero crossing time based on a relay contact close time and relay contact bounce time measured particularly for the relay.

10 Claims, 8 Drawing Sheets

CONFIGURABLE WIRELESS POWER CONTROL AND MANAGEMENT

FIELD OF THE INVENTION

The present disclosure relates to the analysis and automation of mains power in domestic and commercial applications using portable computing devices to provision, control, program and interrogate power management devices through a configurable wireless communications link.

BACKGROUND OF INVENTION

In recent years, the proliferation of smartphones has placed powerful computing devices in the hands of the public. It can be appreciated that users may find it highly advantageous to provision, control, program and interrogate power management devices natively from a smartphone through a configurable wireless communications link.

SUMMARY

In one exemplary embodiment, the system utilizes three components: a power management device with configurable wireless communications capabilities; a battery powered personal controller able to communicate with a power management device via a wireless communications link; and a service platform capable of exchanging data with a personal controller and a power management device. It will be appreciated that reference herein to "preferred" or "preferably" is intended as exemplary only.

Any process or mechanism used to alter the consumption of electricity by a consumer from what they would normally consume, particularly during peak periods, is typically referred to as demand response, that definition being adopted herein. An example of a demand response mechanism is the propagation of a trigger message across a communications network that causes a connected device or appliance to power off as part of shedding load during peak consumption periods.

Examples of power management devices and power control circuits are described in more detail in PCT Application No. PCT/AU2011/001666, filed Dec. 29, 2011, titled "Wireless Power, Light and Automation Control," and PCT Application No. PCT/AU2014/001007, filed Oct. 28, 2014, titled "Adaptable Multi-Mode Wireless Power, Light and Automation", the entire contents of each application being incorporated herein by reference. Examples of connected lighting that may be controlled by, or integrate, a power management device is described in PCT Application No. PCT/AU2014/000283 filed Mar. 14, 2014, titled "Wireless Light Pairing, Dimming and Control", the entire contents of which being incorporated herein by reference.

As used herein, "network Wi-Fi" refers to any Wi-Fi methodology, topology, technology, protocol, standard or specification used in joining or creating a conventional infrastructure mode Wi-Fi network and includes the Wi-Fi Alliance definition as any "wireless local area network (WLAN) products that are based on the Institute of Electrical and Electronic Engineers (IEEE) 802.11 standards" including any amendments, extensions or proprietary implementations. As used herein, the term "Wi-Fi Direct" refers to a device configured to support the Wi-Fi Alliance Wi-Fi Direct specification and any amendments, extensions or proprietary implementations of Wi-Fi peer-to-peer technology. The Wi-Fi Direct specification utilizes and builds on elements of the IEEE 802.11 infrastructure mode adapted to forming peer-to-peer (P2P) communications links. As used herein, the term "group participant" refers to a Wi-Fi P2P Device that can participate in a Wi-Fi P2P group as a Group Owner or P2P Client depending on the outcome of a Wi-Fi Direct negotiation, Group Owner Intent Value or configuration of a Wi-Fi Direct autonomous group. As used in this application, the term "simulating a Wi-Fi access point" refers to a device configured to replicate a wireless infrastructure access point, allowing another network Wi-Fi device to connect as a client in establishing a peer-to-peer communications link and may be implemented as a software enabled access point (SoftAP) or virtual router. Through this mechanism, a peer-to-peer communications link can be established using the infrastructure mode of Wi-Fi without utilizing the Ad Hoc/Independent Basic Service Set mode of Wi-Fi.

Wi-Fi Direct and Bluetooth are peer-to-peer capable communication technologies. Peer-to-peer communication methods and control aspects that may be incorporated into a power management device are described in PCT Application No. PCT/AU2011/001666, filed Dec. 29, 2011, titled "Wireless Power, Light and Automation Control" and PCT Application No. PCT/AU2014/001007, filed Oct. 28, 2014, titled "Adaptable Multi-Mode Wireless Power, Light and Automation". Network Wi-Fi is a communication technology that allows devices to communicate through a WLAN. Adaptable network, peer-to-peer communication methods and system attributes that may be incorporated into a power management device are described in PCT Application No. PCT/AU2014/001007 (mentioned above), and PCT Application No. PCT/AU2012/000959, filed Aug. 15, 2012, titled "Adaptable Wireless Power, Light and Automation System", the entire contents of which is incorporated herein by reference.

In one preferred embodiment, a power management device is preferably configured with a wireless communications module that can operate: as an adaptable peer-to-peer and network Wi-Fi communications interface, either individually or concurrently, using Wi-Fi-Direct and/or network Wi-Fi communication technologies; and optionally as a Bluetooth communications interface using Bluetooth SIG class 2.1+EDR or later communication technologies, including Bluetooth Low Energy, Bluetooth 4.X, Bluetooth 5.X and meshing protocols such as CSRMesh.

In one preferred embodiment, a power management device preferably includes the necessary hardware and circuitry to support any combination of suitable personal area network (PAN) or home area network (HAN) wireless communication technologies, protocols, standards, application profiles or specifications, including one or more of: any ZigBee protocol, application profile, standard or specification published by the ZigBee Alliance; any protocol, standard or specification published by the WI-SUN Alliance; any Z-Wave protocol, standard or specification; any Thread protocol, standard or specification published by the Thread Group Alliance; any protocol, standard or specification based on ANT including ANT+; any protocol, standard or specification based on IEEE 802.15 including, but not limited to, IEEE 802.15.4; any protocol, standard or specification based on IEEE 802.11; including any amendments, extensions, revisions or proprietary implementations. It will be understood by those of ordinary skill in the art that a ZigBee application profile typically defines a domain space of related applications and devices including the message types in a target application, the message formats, and the processing actions of a ZigBee device. Unless otherwise noted, the wireless local network communications capabilities will be described in terms of ZigBee, though the disclosure is not so limited and, for example, may be performed by utilizing a Z-Wave, Thread or WI-SUN protocol, standard or specification. It can be appreciated that while IEEE 802.11 technologies can be used for wireless HAN communications, IEEE 802.11 technologies are outlined separately in this application to other HAN or PAN technologies that may be integrated into a power management device in order to provide greater clarity of the proposed invention. It can be appreciated that while Bluetooth technologies can be used for wireless PAN communications, Bluetooth technologies are outlined separately in this application to other HAN or PAN technologies that may be integrated into a power management device in order to provide greater clarity of the proposed invention.

PAN and HAN methods and system attributes that may be incorporated into a power management device are described in PCT Application No. PCT/AU2013/001157, filed 8 Oct. 2013, titled "Wireless Power Control and Metrics", PCT Application No. PCT/AU2015/050136, filed Mar. 30, 2015, titled "Wireless Power Metering and Metrics", and PCT Application No. PCT/AU2015/050290, filed 28 May 2015, titled "Wireless Power Control, Metrics and Management, the entire contents of each application being incorporated herein by reference.

In one preferred embodiment, a power management device preferably includes the necessary hardware, circuitry and subscriber identity module or subscriber identification module (SIM) to support wireless communication via a cellular or mobile broadband modem and is configured to support one or more wireless communication technology, protocol, standard or specification, such as International Mobile Telecommunications-2000 (IMT-2000), General Packet Radio Service (GPRS), Code Division Multiple Access (CDMA), CDMA2000, Global System for Mobiles (GSM), Time Division-Code Division Multiple Access (TD-CDMA), Time Division-Synchronous Code Division Multiple Access (TD-SCDMA), Enhanced Data rates for GSM Evolution (EDGE), Evolved EDGE, High-Speed Packet Access (HSPA), Evolved High-Speed Packet Access (HSPA+), Wideband Code Division Multiple Access (WCDMA), Universal Mobile Telecommunications System (UMTS), High Capacity Spatial Division Multiple Access (HC-SDMA), High Performance Radio Metropolitan Area Network (hiperMAN), Worldwide Interoperability for Microwave Access (WiMAX), WiMAX-Advanced, Long-Term Evolution (LTE), LTE-Advanced, TD-LTE, LTE-MTC (Long-Term Evolution-Machine Type Communication), IMT-Advanced, 5th generation mobile networks or 5th generation wireless systems (5G).

In one preferred embodiment, a power management device preferably includes the necessary hardware and circuitry to support single or bi-directional low power, wide area (LPWA) wireless communication technologies, protocols, standards or specifications. Where desirable, LPWA wireless communications may be configured for compatibility with one or more technology, protocol, standard or specification from Amber Wireless, Coronis, Greenwaves, Haystack Technologies, Link Labs, Actility, Telensa, Huawei CIoT, LoRa, M2M Spectrum Networks, NWave, On-Ramp Wireless, Senaptic, Sigfox, Neul, Weightless, WAVIoT, Orange POPS or other suitable solutions including additional proprietary solutions based on 802.15.4 technologies.

In one preferred embodiment, a power management device is preferably configured with a power measurement module that can report a range of data to the system microcontroller. This may include any combination of parameters, metrics, conditions, and specifications associated with electricity being supplied to an electrical circuit and electricity being used on an electrical circuit or by an electrical device, such as, but not limited to: instantaneous voltage, current and power; active, reactive and apparent power; average real power; RMS voltage and current; power factor; line frequency; overcurrent; voltage sag; voltage swell; phase angle; and temperature. These metrics may be recorded to memory, transferred to a service platform, transferred to a personal controller, or utilized by system microcontroller to determine: the timing for switching a relay or power control element; electricity consumed over a time period; operational characteristics including any deviation from a specification, limit or base measurement; temperature; service requirements; analysis; and/or any other metric or logical sequencing that could be compiled from the measured, recorded or stored data from a power measurement module. The power measurement module is preferably configured with any combination and mix of Rogowski Coil(s), current transformer(s) or shunt resistor(s) to facilitate measurements.

In one preferred embodiment, a power management device preferably includes a power control circuit or circuits. Power management device's microprocessor is preferably configured to individually and selectively vary power to a power control circuit or circuits. In one preferred embodiment, a power management device may not be configured with any power control circuits and operate as a power measurement device. Power measurement and reporting capabilities that may be integrated into a power management device are described in PCT Application No. PCT/AU2015/050136 filed Mar. 30, 2015, titled "Wireless Power Metering and Metrics".

The personal controller is preferably a commercially available mobile computing device that supports at least network Wi-Fi and may also support Wi-Fi Direct and/or Bluetooth and/or Near Field Communications (NFC). Unless otherwise noted, the personal controller will be described in terms of a smartphone, though the disclosure is not so limited. For example only, the personal controller may be a computing device which can: download or install by other means an Applications Program (App); have a suitable interface the user can interact with to control the App in order to execute required functions; have the wireless communications capability to establish a communications link with a power management device; and have the communications capability to exchange data with a service platform. Where location services are required, the personal controller is preferably equipped with a geographic location determining capability by way of Global Positioning System technology (GPS) and/or other positional technology such as, by way of example only, assisted GPS, synthetic GPS, cell ID, inertial sensors, beacons (including Wi-Fi and Bluetooth beacons), terrestrial transmitters, and geomagnetic field techniques, or any combination thereof, enabling the personal controller to determine its global location coordinates. Where a satellite method is used to determine location, the personal controller may preferably utilize one or more constellation location specifications such as USA Global Positioning System (GPS), Russian Global Navigation Satellite System (GOLNASS), European Union Galileo Positioning System, Chinese Compass Navigation System, Indian Regional Navigational Satellite System or others. Examples of personal controllers include smartphones, tablets, laptops, smart watches, smart eye wear, ultrabooks and notebook personal computers. The functional elements of a personal controller may be performed by separate devices preferably configured to work in unison as part of a mobile computing platform, each of the component devices being a device designed for typical mobile use. By way of example, a smart watch functionally coupled to a smartphone may deliver the functional capabilities of a personal controller by operating as a unified mobile computing platform.

The present disclosure in one preferred embodiment sets forth a power management device with wireless communication capabilities derived from any combination and number of integrated circuits, components, controllers, transceivers, radios, memory, microprocessors, and aerials that provide a simulated access point, a network Wi-Fi and/or Wi-Fi Direct connection, or connections, individually or concurrently. In some preferred embodiments, a power management device may preferably be configured with any combination and number of integrated circuits, components, controllers, transceivers, radios, memory, microprocessors, and aerials to support a wireless Bluetooth connection or connections. In some preferred embodiments, a power management device may preferably be configured with any combination and number of integrated circuits, components, controllers, transceivers, radios, memory, microprocessors, and aerials to support one or more wireless PAN or HAN utilizing one or more of ZigBee, Z-Wave, Thread, WI-SUN, ANT or an alternate wireless network communications protocol, standard or specification. In some preferred embodiments, a power management device may preferably be configured with any combination and number of integrated circuits, components, controllers, transceivers, radios, memory, microprocessors, and aerials to support more than one wireless ZigBee network running simultaneously or concurrently, and where desirable, each of the simultaneous or concurrent ZigBee networks may operate using a different ZigBee application profile (or profiles), standard, specification or protocol stack. In some preferred embodiments, a power management device may preferably be configured with any combination and number of integrated circuits, components, controllers, transceivers, radios, memory, microprocessors, and aerials to support one or more cellular or mobile broadband data connections. In some preferred embodiments, a power management device may preferably be configured with any combination and number of integrated circuits, components, controllers, transceivers, radios, memory, microprocessors, and aerials to support a LPWA network data connection or connections.

In some preferred embodiments, a power management device preferably includes any combination and number of integrated circuits, components, controllers, transceivers, radios, memory, microprocessors, and aerials to support communications via one or more wireless communication protocol, standard, or specification on more than one carrier frequency, such as, and by way of example only, ZigBee operating simultaneously or selectively on a carrier frequency of 2.4 GHz and a chosen frequency under 1 GHz, Wi-Fi operating simultaneously or selectively across a mix of carrier frequencies such as any combination or mix of sub-1 GHz, 2.4 GHz, 5 GHz, 60 GHz or other suitable frequencies, cellular communications operating on narrow band and wideband frequencies and/or LPWA communications operating on narrow band and wideband frequencies. Where desirable, a power management device may utilize more than one aerial in support of one or more antenna diversity techniques. Aerials may be wholly located inside a power management device or mounted to the exterior as required.

Depending on cost and desired outcome, the wireless communication capabilities of a power management device may be achieved by using: any number and combination of radios, aerials, transceivers, microprocessors, memory, components, integrated circuits and controllers either individually, collectively, or as a system in a package (SiP) or as a system on a chip (SoC) or a package on package (PoP); a combination or "combo" chip that aggregates the functionality of a number of transceivers and controllers of different standards as a SiP, SoC or PoP; or using any combination and number of combo chip(s), SiP(s), SoC(s), PoP(s) and/or discrete components, integrated circuits, radios, aerials, transceivers, memory, microprocessors and controllers. A power management device may utilize single or multiple: wireless bands; physical channels; virtual channels; modes; or other coexistence technologies and algorithms, the methods of which are familiar to those of ordinary skill in the art and for simplicity are not described herein. Depending on the chosen hardware components, the power management device may also include shared antenna support and shared signal receiving paths to eliminate the need for an external splitter or reduce the number of aerials required.

A smartphone App is preferably used to configure and control the functional capabilities of a power management device. In addition to configuring the operational aspects of a power management device, an App would also preferably be used to do one or more of the following: commission, authenticate, encrypt, secure, measure, process, execute, analyse, compile, exchange, transfer, install, send, receive, store, update, manipulate, display, generate and/or transpose data, from, or to, a power management device or service platform in any necessary way. Such data may include command, control, location and configuration data. Data capabilities of the App may be executed by the smartphone or may integrate an external service platform.

A power management device is preferably configured to measure, process, execute, report, analyse, compile, exchange, transfer, send, receive, store, generate, install, authenticate, compress, encrypt, secure and/or manipulate data and/or transpose data, from, or to, an App, service platform, or other appliances and devices in any necessary way. Such data may include command, control, location and configuration data.

The service platform is preferably a cloud, applications service platform or software as a service platform that utilizes a computer(s), computing device(s) or server(s) to do one or more of the following: measuring, interrogating, processing, analysing, compiling, exchanging, transferring, sending, receiving, storing, manipulating, displaying, cataloguing, securing, authenticating, commissioning, updating, encrypting, generating and/or transposing data, from, or to, the App, a power management device and/or a third party or parties. Such data may include any one or more of analysis, command, control, configuration, provisioning, account, tariff, billing, historical, measured, location, authentication and trend data.

In one preferred aspect, the disclosure sets forth an electromechanical relay switching system for reducing electromagnetic interference and/or radio frequency interference. The system includes at least one electromechanical relay having an energizeable coil configured to close the relay; a power measurement circuit configured to measure voltage; and a microcontroller having a non-volatile memory, the microcontroller being configured determine a voltage zero crossing time based on the voltage measured by the power measurement circuit, the microcontroller being configured to synchronize energizing the coil relative to the voltage zero crossing time based on a relay contact close time as measured particularly for the relay, and based on a relay contact bounce time as measured particularly for the relay.

In another preferred aspect, the disclosure sets forth a method for energizing an electromechanical relay with reduced electromagnetic interference and/or radio frequency interference. The method includes measuring a contact close time, and a contact bounce time, each of the measurements being particular to the relay; storing the measured contact close time and the measured contact bounce time in a memory operatively connected to a microcontroller configured to energize the relay; measuring a voltage in a circuit containing the relay; determining a voltage zero crossing time based on the measured voltage; and energizing the relay based on the measured contact close time, the measured contact bounce time, and the voltage zero crossing time.

In a further preferred aspect, the disclosure sets forth an electromechanical relay switching system for reducing electromagnetic interference and/or radio frequency interference. The system includes at least one electromechanical relay having an energizeable coil configured to close the relay; a power measurement circuit configured to measure current; and a microcontroller having a non-volatile memory, the microcontroller being configured determine a current zero crossing time based on the current measured by the power measurement circuit, the microcontroller being configured to synchronize de-energizing the coil relative to the current zero crossing time based on a relay opening time as measured particularly for the relay.

In an additional preferred aspect, the disclosure sets forth a multi-network power management device for controlling a supply of electricity to an electrical apparatus or system. The device includes a radio transceiver configured to communicate with the personal controller in at least two different modes, a first of the modes being a peer-to-peer communications mode, a second of the modes being a non-peer-to-peer communication mode; a cellular radio transceiver configured to communicate on a low-power, wide area network; a microcontroller configured to open a peer-to-peer wireless communications link with the personal controller by simulating a Wi-Fi access point, the microcontroller storing a unique device code useable by a low-power, wide area network operator to enable the cellular radio transceiver to communicate on the low-power, wide area network, the microcontroller being configured to utilise the peer-to-peer radio transceiver to transmit the unique device code to the low-power, wide area network operator; and a power control circuit configured to vary the supply of electricity to the electrical apparatus or system based at least in part on instructions communicated from the personal controller through the peer-to-peer radio transceiver.

In yet a further preferred aspect, the disclosure sets forth a method for enabling a power management device to operate on a low-power, wide area network to control a supply of electricity to an electrical apparatus or system. The method includes beaconing, via a radio transceiver in the power management device, infrastructure network information of the power management device; discovering an infrastructure network of the power management device with a personal controller; establishing a peer-to-peer communications link between the power management device and the personal controller; receiving, at the power management device, a request for a unique device code of a cellular radio transceiver utilised by the power management device; transmitting the unique device code to a low-power, wide area network operator to enable the power management device to operate on a low-power, wide area network operated by the low-power, wide area network operator; and varying the supply of electricity to an electrical apparatus or system operationally connected to the power management device through the low-power, wide area network after the power management device is enabled to operate on the low-power, wide area network.

In another preferred aspect, the disclosure sets forth a multi-network power management device for controlling a supply of electricity to an electrical apparatus or system. The device includes a radio transceiver configured to communicate with the personal controller in at least two different modes, a first of the modes being a peer-to-peer communications mode, a second of the modes being a non-peer-to-peer communication mode; a cellular radio transceiver configured to communicate on a telecommunications mobile network; a microcontroller configured to open a peer-to-peer wireless communications link with the personal controller by simulating a Wi-Fi access point; an embedded SIM, the microcontroller being configured to store a unique device code associated with the embedded SIM, the unique device code being useable by a mobile network operator to enable the cellular radio transceiver to communicate on the telecommunications mobile network, a power control circuit configured to vary the supply of electricity to the electrical apparatus or system based at least in part on instructions communicated from the personal controller through the peer-to-peer radio transceiver.

In a further preferred aspect, the disclosure sets forth a method for provisioning a power management device onto a cellular communications network to control a supply of electricity to an electrical apparatus or system. The method includes beaconing, via a radio transceiver in the power management device, infrastructure network information of the power management device; discovering an infrastructure network of the power management device with a personal controller; establishing a peer-to-peer communications link between the power management device and the personal controller; receiving, at the power management device, a request for a unique device code of a Subscriber Identification Module (SIM) embedded in the power management device; transmitting the unique device code to a cellular network operator to enable the power management device to operate on a cellular network operated by the cellular network operator; and varying the supply of electricity to an electrical apparatus or system operationally connected to the power management device through the cellular network after the power management device is enabled to operate on the cellular network.

In a further preferred aspect, the disclosure sets forth a power management device for controlling a supply of electricity to at least one electrical apparatus or system. The device includes a radio transceiver configured to communicate with a personal mobile communications device in at least two different modes, a first of the modes being a peer-to-peer communications mode, a second of the modes being a non-peer-to-peer communication mode, the personal mobile communications device including circuitry for determining global position. The device also includes a microcontroller configured to open a peer-to-peer wireless communications link with the personal mobile communications device, the microcontroller being configured to extract current global location coordinates from the personal mobile communications device when the personal mobile communications device is within peer-to-peer communications range of the radio transceiver. The microcontroller is configured to adopt the global location coordinates of the personal communications device as the global location coordinates of the power management device. The device also includes a power control circuit configured to vary the supply of electricity to the electrical apparatus or system based at least in part on the adopted global location coordinates.

In a further preferred aspect, the disclosure sets forth a method for controlling a supply of electricity to at least one electrical apparatus or system in a commercial or residential structure. The method includes determining that a personal mobile communications device is within peer-to-peer communications range of a power management device; receiving, at the power management device, a current global location of the personal mobile communications device; adopting the current global location of the personal mobile communications device received at the power management device as the global location of the power management device; and varying the supply of electricity to the electrical apparatus or system based at least in part on the adopted global location.

In yet another preferred aspect, the disclosure sets forth a power management device for controlling a supply of electricity to at least one electrical apparatus or system. The device includes a radio transceiver configured to communicate with a personal mobile communications device in at least two different modes, a first of the modes being a peer-to-peer communications mode, a second of the modes being a non-peer-to-peer communication mode. The device also includes a power control relay configured to vary the supply of electricity to the electrical apparatus and/or system. The device further includes a power factor correction circuit including a relay and a capacitor; and a power measurement circuit configured to measure power across a mains power feed. The device also includes a microcontroller configured to open a peer-to-peer wireless communications link with the personal mobile communications device using the first mode, the microcontroller being configured to use power measurement readings from the power measurement circuit to determine a power factor. The microcontroller is also configured to use the determined power factor to adjust switching of the power factor correction circuit relay.

In additional preferred aspect, the disclosure sets forth a power management device for controlling a supply of electricity to at least one electrical apparatus or system. The device includes a radio transceiver configured to communicate with a personal mobile communications device in at least two different modes, a first of the modes being a peer-to-peer communications mode, a second of the modes being a non-peer-to-peer communication mode. The device also includes a mains power relay configured to vary the supply of electricity to the electrical apparatus and/or system. The device includes a power factor correction circuit including a relay and a capacitor; and a power measurement circuit configured to measure power across a mains power feed and determine a power factor based on the power measurement readings. The device also includes a microcontroller configured to open a peer-to-peer wireless communications link with the personal mobile communications device using the first mode, the microcontroller being configured to use the power factor determined from the power measurement circuit to adjust switching of the power factor correction circuit relay.

In another preferred aspect, the disclosure sets forth a power management system for controlling a supply of electricity to at least one electrical apparatus or system. The system includes a power management device including: a radio transceiver configured to communicate with a personal mobile communications device in at least two different modes, a first of the modes being a peer-to-peer communications mode, a second of the modes being a non-peer-to-peer communication mode; a mains power relay configured to vary the supply of electricity to the electrical apparatus and/or system; a power measurement circuit configured to measure power across a mains power feed; and a microcontroller configured to open a peer-to-peer wireless communications link with the personal mobile communications device using the first mode. The system also includes a power factor corrector including a relay, a capacitor, and a microcontroller configured to use a power factor value from the power management system, the microcontroller of the power factor corrector being configured to use the power factor value to adjust switching of the relay of the power factor corrector.

The reference to any prior art in this specification is not, and should not be taken as an acknowledgement or any form of suggestion that the prior art forms part of the common general knowledge in Australia or in any other country.

The claims as filed and attached with this specification are hereby incorporated by reference into the text of the present description.

DETAILED DESCRIPTION OF THE DRAWINGS

Figure 1:
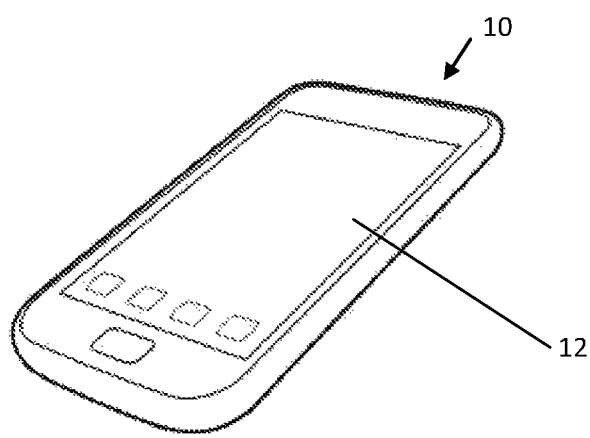
FIG. 1 is a perspective view of a smartphone useable with or as part of a system and method disclosed herein.

Alternative embodiments of the disclosure will be apparent to those of ordinary skill in the art from consideration of the specification. It is intended that the specification and examples be considered as exemplary only, with a true scope and spirit of the disclosure being indicated by the claims which follow. It will be understood that the term "comprising" is intended to have a broad, open meaning and not limited to a particular embodiment.

Referring to FIGS. 1 to 4, system 100 preferably includes an applications program, hereby termed a "Product App," a personal controller in the form of a smartphone 10, a power management device 200 and a service platform 500. While not shown, power management device 200 may communicate with any number of appliances or devices within a PAN or HAN network 24 utilizing the topology and methodology of a chosen shared network communication protocol, standard, or specification, up to the maximum number of devices supported by the chosen communication protocol, standard, or specification, the methods of which would be understood by a person of ordinary skill in the art of network communications. It will be appreciated that more than one PAN or HAN network 24 may operate concurrently or simultaneously in a given installation and that each network may utilize different communication protocols, standards, specifications and application profiles.

Figure 4:
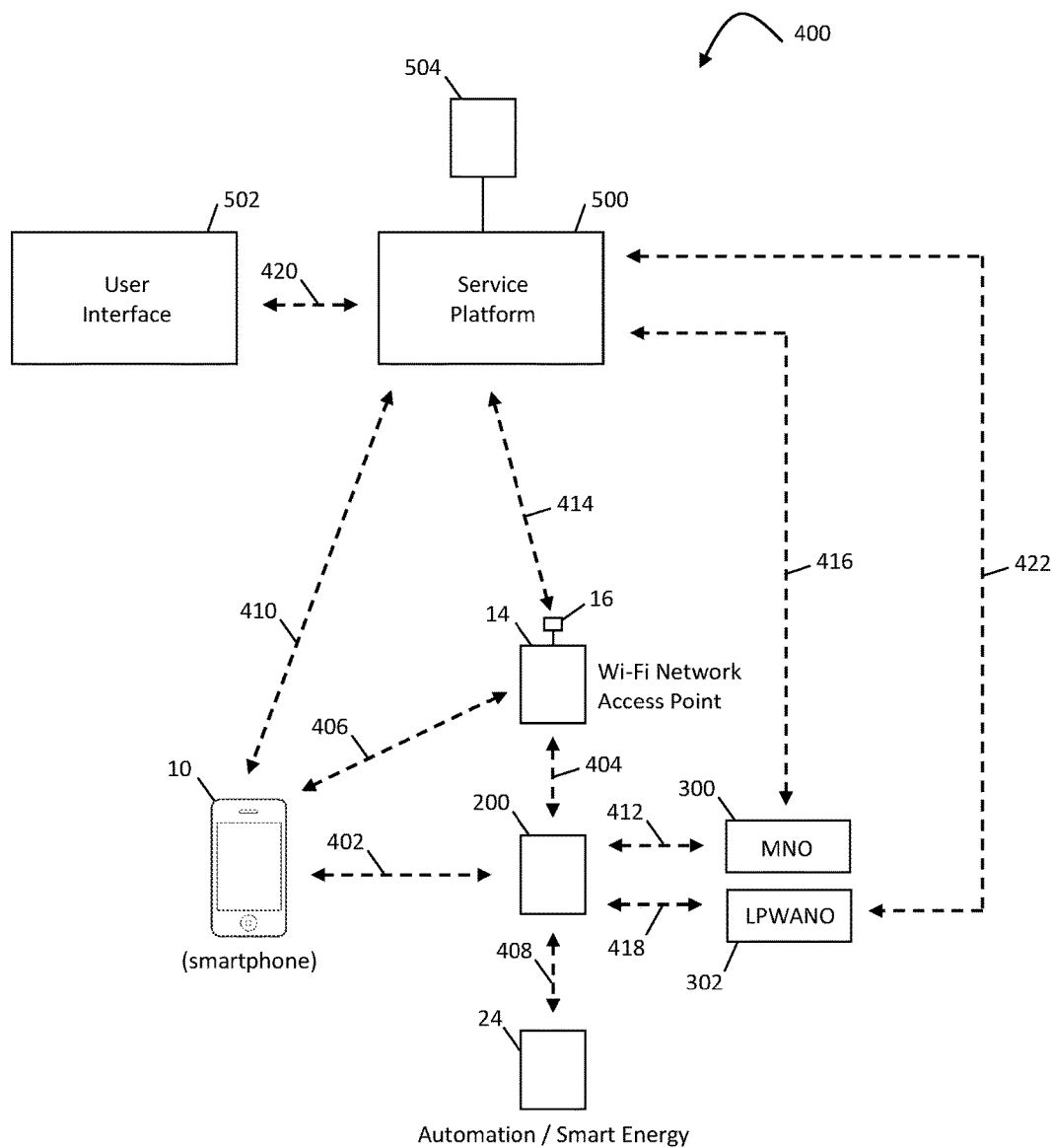
FIG. 4 is a pictorial representation of the communication pathways between the smartphone of FIG. 1, a power management device of FIG. 2 and a service platform.

It will be understood that when needed, the Product App is typically used in combination with one or more processors, and where it is hosted, configures what might otherwise be a general purpose processor into a special purpose processor according to the functions and parameters of the Product App. Preferably, the Product App is downloaded to a computer readable medium such as a memory in smartphone 10 and operates as a human interface for the control, configuration, provisioning, programming and/or interrogation of one or more of power management devices 200 as well as a means for displaying, processing and exchanging data with, and where desirable between, a power management device 200 and service platform 500 (FIG. 4). The Product App may reside in or be stored on a number of different computer readable mediums such as, for example, a cloud server, and physical memories associated with computer devices, servers, and transportable storage devices and memory sticks.

FIG. 1 is a perspective representation of a smartphone 10 which uses a wireless link to communicate with a power management device, described in further detail below. Smartphone 10 is preferably a commercially available, conventional smartphone. Some of the basic functions the smartphone preferably includes are: a touch sensitive graphical screen interface 12; a radio transceiver; and the ability to run the Product App specific to the individual smartphone operating system. In the examples that follow, specific coding for the Product App has been omitted for simplicity as a person of ordinary skill in the art would be able to understand and reproduce the functionality of the described embodiments without the need for discussion on particular coding.

Smartphone 10 is preferably configured to operate across a range of wireless communications technologies, including the technology to communicate via at least network Wi-Fi. Smartphone 10 may include additional capability for Wi-Fi Direct and/or Bluetooth and/or NFC. While preferred embodiments of the present disclosure use a smartphone as its controller, and specifically a smartphone incorporating at least network Wi-Fi capabilities, other wireless communications methods and systems could be used depending on any specific requirements.

Smartphone 10 is preferably equipped with a geographic location determining capability by way of GPS and/or other positional technology such as, by way of example only, assisted GPS, synthetic GPS, cell ID, inertial sensors, beacons (including Wi-Fi and Bluetooth beacons), terrestrial transmitters, and geomagnetic field techniques, or any combination thereof, enabling the personal controller to determine its relative global location. Where a satellite method is used to determine location, smartphone 10 may preferably utilize one or more constellation location specifications such as USA Global Positioning System (GPS), Russian Global Navigation Satellite System (GOLNASS), European Union Galileo Positioning System, Chinese Compass Navigation System, Indian Regional Navigational Satellite System or others.

Figure 2:
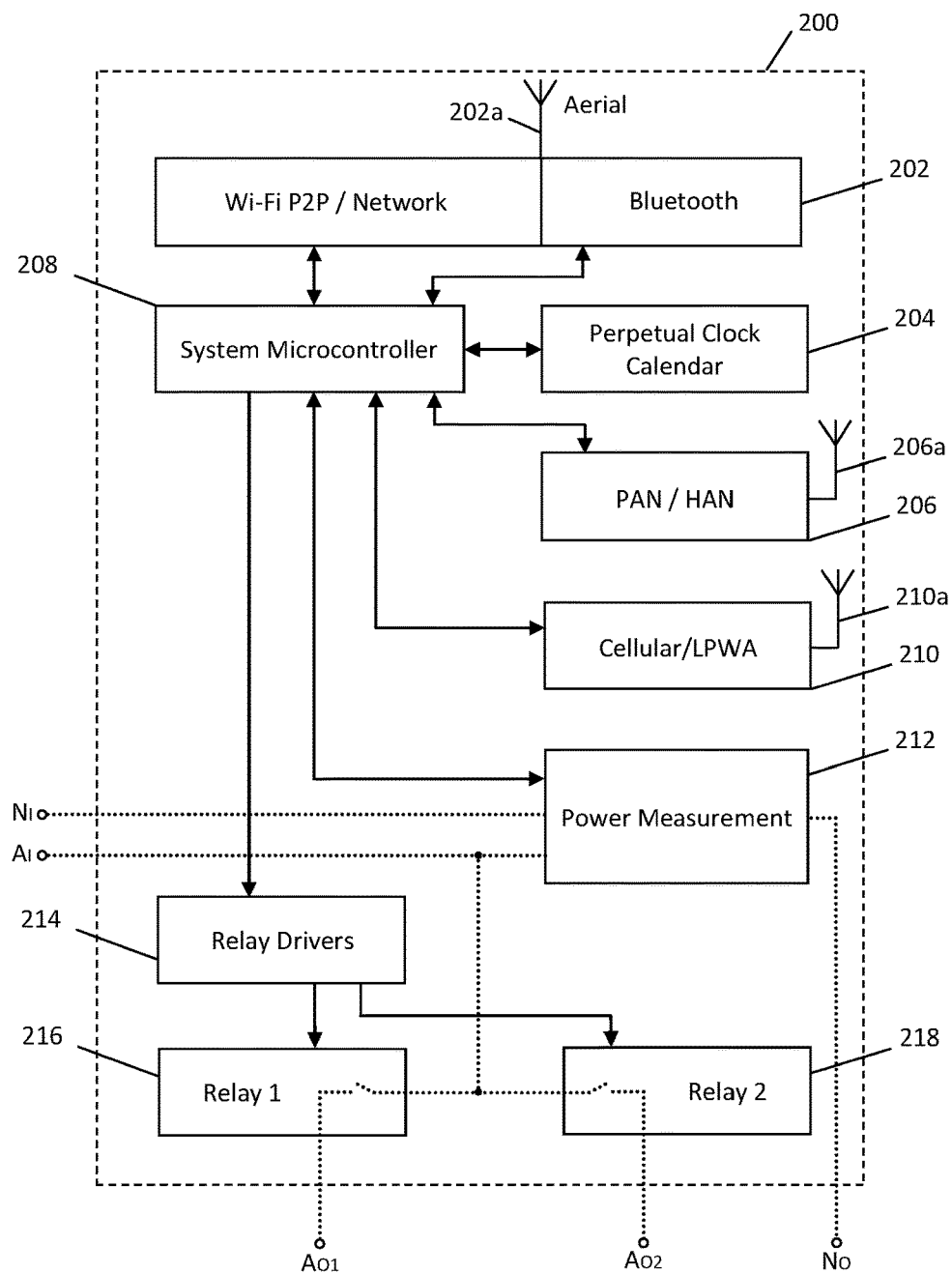
FIG. 2 is a block diagram of the functional elements of a power management device in accordance with a preferred embodiment of the present disclosure.

Referring now to FIG. 2, a power management device 200 is shown in accordance with a preferred embodiment of the present disclosure. The power management device shown in FIG. 2 generally is an overview of a preferred single phase power management device with additional preferred forms possible through the configuration of wireless communications and power control circuits as described below. Power management device 200 is a physical device that preferably includes perpetual clock calendar 204, system microcontroller 208 with embedded memory, and power measurement module 212. Depending on the application and communication requirements, power management device 200 may be configured with any mix and number of: adaptable communications 202 with aerial 202a; local network communications 206 with aerial 206a; cellular communications 210 with aerial 210a; and power control circuits such as relay drivers 214, a first relay 216, and a second relay 218. By way of example, a power control device could be configured with adaptable communications 202 or cellular communications 210, or could be configured with adaptable communications 202 and cellular communications 210.

In some preferred embodiments, it may be preferable for system microcontroller 208 to support external memory in addition to, or instead of, embedded memory. In some preferred embodiments, it may be preferable for system microcontroller 208 to be fully integrated into one of the wireless communications sub-systems such as adaptable communications 202 or local network communications 206.

Adaptable communications 202 includes the circuitry permitting power management device 200 to communicate with smartphone 10, other appliances or devices and/or other system elements across one or more communications topologies and one or more communication protocols, standards, or specifications as will be described in further detail below. Such appliances or devices may include other power management devices, smart meters, sub-meters, interval meters, home appliances and devices, industrial appliances and devices, inverters, solar systems, battery systems, electric cars, hubs, routers and/or other networked elements. Local network communications 206 includes the circuitry permitting power management device 200 to communicate with other appliances or devices and/or other system elements in a PAN or HAN across one or more communications topologies and one or more communication protocols, standards, or specifications as will be described in further detail below. Such appliances or devices may include other power management devices, smart meters, sub-meters, interval meters, home appliances and devices, industrial appliances and devices, inverters, solar systems, battery systems, electric cars, hubs, routers and/or other system or networked elements. Cellular communications 210 includes the circuitry permitting power management device 200 to communicate with smartphone 10 and/or other system elements across one or more communications topologies and one or more communication protocols, standards, or specifications as will be described in further detail below.

While not show, in one preferred embodiment power management device 200 preferably includes the necessary circuitry and components to communicate by way of power line communications and includes the necessary capabilities for impressing a modulated carrier signal onto mains power wiring. The supported power line communications may be by way of any protocol, standard or specification that facilitates communication by a power management device 200 using mains power wiring. In one preferred embodiment, power line communications incorporates one or more of: the HomePlug Powerline Alliance Homeplug standards or specifications including HomePlug Green PHY or Homeplug AV2; any G3-PLC Alliance standards or specifications or equivalent 802.15.4 technologies; IEEE 1901, 1901.1, 1901.2 standards or specifications; and/or ITU-T's G.hn standards or specifications; including any amendments, extensions, subsets, revisions or proprietary implementations. Other suitable protocols, standards or specifications include, but are not limited to, those from the Universal Powerline Association, SiConnect, the HD-PLC Alliance, Xsilon, and the Powerline Intelligent Metering Evolution Alliance. Power line communication, control methods and system attributes that may be incorporated into a power management device are described in PCT Application No. PCT/AU2013/001157, filed Oct. 8, 2013, titled "Wireless Power Control and Metrics", PCT Application No. PCT/AU2015/050077, filed Feb. 25, 2015, titled "Wireless and Power Line Light Pairing, Diming and Control", PCT Application No. PCT/AU2015/050136, filed 30 Mar. 2015, titled "Wireless Power Metering and Metrics", and PCT Application No. PCT/AU2015/050290, filed May 28, 2015, titled "Wireless Power Control, Metrics and Management, the entire contents of each application being incorporated herein by reference. In one preferred embodiment, power line communications may be implemented using a single chip solution with integrated random access memory (RAM), physical layer (PHY), medium access controller (MAC), and analog front end.

While not shown, in one preferred embodiment power management device 200 preferably includes the necessary circuitry and components to communicate by way of bidirectional visible, infrared or ultraviolet optical wireless communications such as, and by way of example, Li-Fi.

While not shown, in one preferred embodiment power management device 200 preferably includes the necessary circuitry and components to communicate by way of near field magnetic induction (NFMI).

While not shown, in one preferred embodiment power management device 200 preferably includes the necessary circuitry and components to communicate via cabled or optical fibre networking technologies such as, and by way of example, Ethernet.

Perpetual clock calendar 204 preferably includes a power backup by the way of a battery or supercapacitor enabling real time to be accurately maintained in instances where power is lost. Inclusion of a perpetual clock calendar 204 allows system microcontroller 208 to automatically generate commands; record data; perform a function, measurement or calculation; sequence events; time stamp; and/or exchange data, based on time and/or date. In some preferred embodiments, perpetual clock calendar 204 may be omitted where power management device 200 does not perform any time or date dependant operations or receives clock data from an external source via a communications connection. In some preferred embodiments, perpetual clock calendar 204 may be an embedded function of system microcontroller 208.

Power management device 200 is preferably configured with a physical interface for connection to the mains power wiring in a building, structure or installation and preferably includes the necessary current transformer, resistive voltage divider, potential transformer (voltage transformer) or instrument transformers to appropriately isolate or transform voltage or current levels for the purpose of taking measurements through power measurement 212. An installation includes dedicated applications such as, by way of example only, a dedicated pumping facility or lighting in a public park.

In one preferred embodiment, power management device 200 preferably incorporates a terminal block configured for wiring directly into the mains power of a building, structure or installation. In one preferred embodiment, power management device 200 mounts in accordance with a rail standard, such as a DIN rail standard, allowing it to install alongside circuit breakers or industrial electrical equipment in a typical circuit breaker box. It may be desirable in certain applications to integrate a circuit breaker within power management device 200. In another preferred embodiment, a power management device 200 is preferably configured in a weather resistant housing, a general purpose housing, wall panel, or behind a wall mounted panel, or integrated into a general purpose power outlet or three phase power outlet. In another preferred embodiment, power management device 200 is configured for compatibility with the NEMA 5-15 North American or BS 1363 mains power standard allowing it to plug directly into a mains power general purpose outlet and accept an appliance or device plugged into it. In one preferred embodiment, power management device 200 may take the physical form of a fully self-contained plug in pack or "wall wart". In another preferred embodiment, power management device 200 may have a flying lead. In another preferred embodiment, power management device 200 may be integrated into an energy consuming device or appliance. In another preferred embodiment, power management device 200 may take the physical form of a module with a housing and an interface configured to be plugged into an energy consuming device or appliance. Modular and system attributes that may be incorporated into a power management device are described in PCT Application No. PCT/AU2013/000260, filed Mar. 15, 2013, titled "Modular Wireless Power, Light and Automation Control", and PCT Application No. PCT/AU2014/050383, filed Nov. 27, 2014, titled "Modular Wireless Power, Light and Automation Control with User Verification", the entire contents of each application being incorporated herein by reference. A power management device 200 may be configured for single phase or three phase applications as required. It will be appreciated that a power management device 200 can be configured according to the wiring, connecting, mounting, plug and socket, and current and voltage requirements of various countries and applications without departing from the scope of the present disclosure.

The commands and responses between system microcontroller 208 and smartphone 10 can preferably be communicated through a radio frequency wireless link supported by adaptable communications 202 and aerial 202a. Adaptable communications 202 preferably includes any number and combination of integrated circuits, components, controllers, transceivers, radios, memory, microprocessors, and aerials that provide a network Wi-Fi and Wi-Fi peer-to-peer connection, or connections, individually or concurrently, with the ability to optionally support Bluetooth. Depending on cost and desired outcome, adaptable communications 202 may use any number and combination of radios, aerials, transceivers, microprocessors, memory, components, integrated circuits and controllers either individually, collectively, or as a system in a package (SiP) or as a system on a chip (SoC) or as a package on package (PoP); a combination or "combo" chip that aggregates the functionality of a number of transceivers and controllers of different standards as a SiP or SoC; or using any combination and number of combo chip(s), SiP(s), SoC(s), PoP(s) and/or discrete integrated circuits, radios, aerials, transceivers, microprocessors, memory, components and controllers. Adaptable communications may utilize single or multiple: wireless bands; physical channels; virtual channels; modes; or other coexistence technologies and algorithms. Depending on the chosen hardware components, adaptable communications 202 may include shared antenna support and shared signal receiving paths to eliminate the need for an external splitter or reduce the number of aerials required. In one preferred embodiment, adaptable communications 202 may be configured to support ZigBee. If desired, an additional aerial or aerials may be added where desirable.

Adaptable communications 202 is configured with at least a Wi-Fi radio that preferably operates in a peer-to-peer mode, utilizing Wi-Fi Direct or simulating a Wi-Fi access point, and in a network Wi-Fi mode. In one preferred embodiment, adaptable communications 202 configured with at least a Wi-Fi radio is preferably capable of operating in a peer-to-peer mode, utilizing Wi-Fi Direct or simulating a Wi-Fi access point, and in a network Wi-Fi mode concurrently. Concurrent connections preferably include support for multiple MAC entities which, for example, may be maintained using two separate physical MAC entities, each associated with its own PHY entity, or using a single PHY entity encompassing two or more virtual MAC entities.

When adaptable communications 202 operates using a peer-to-peer Wi-Fi specification or standard, preferably Wi-Fi Direct or simulating a Wi-Fi access point, it can communicate with smartphones that support network Wi-Fi or Wi-Fi Direct on a peer-to-peer basis without the need for any intermediary hardware. Adaptable communications 202 is preferably configured to operate according to the Wi-Fi Direct specification as both a Wi-Fi Direct group participant and software access point or adaptable communications 202 is preferably configured as a SoftAP, allowing power management device 200 to simulate an infrastructure mode Wi-Fi access point and appear to smartphones communicating with network Wi-Fi as a conventional Wi-Fi access point. In that way, adaptable communications 202 is able to establish a peer-to-peer communications link with a network Wi-Fi device even though the network Wi-Fi device may not support Wi-Fi Direct. In this instance, a smartphone using network Wi-Fi to communicate will receive a network discovery message, beacon, probe response and/or Service Set Identifier (SSID) from power management device 200 as if power management device 200 were a conventional Wi-Fi access point and the smartphone will be able to establish a peer-to-peer communications link with the power management device as though it were connecting as a client to a conventional Wi-Fi access point. Smartphone 10 and power management device 200 can then form a peer-to-peer communications link using an infrastructure mode of Wi-Fi rather than Ad Hoc mode. The procedure of establishing a communications link between a Wi-Fi Direct device, or a device simulating an access point, and network Wi-Fi devices are defined by the Wi-Fi Alliance and IEEE Wi-Fi standards and specifications and would be understood by practitioners skilled in communications systems protocols.

In one preferred embodiment, adaptable communications 202 is preferably configured as a Group Owner so that a network Wi-Fi device, such as smartphone 10, using an 802.11 scan process, such as that defined in the 802.11-2012—IEEE Standard for Information technology—Telecommunications and Information Exchange Between Systems Local and Metropolitan Area Networks—Specific Requirements Part 11: Wireless LAN Medium Access Control (MAC) and Physical Layer (PHY) Specifications or its equivalent, will receive a probe response frame from adaptable communications 202 as per an 802.11-IEEE Standard allowing the network Wi-Fi device to preferably initiate a Wi-Fi Simple Configuration in order to connect with power management device 200.

Wi-Fi Direct has a number of advantages which simplify communications between a power management device and a smartphone. Significant advantages include mobility and portability, where a smartphone and power management device only need to be within radio range of each other to establish a wireless communications link. Wi-Fi Direct offers secure communications through means such as Wi-Fi Protected Access (WPA, WPA2) protocols and encryption for transported messages, ensuring the system remains secure to qualified devices. One of the advantages of configuring adaptable communications 202 with Wi-Fi Direct or to simulate a Wi-Fi access point is that it allows a smartphone with only network Wi-Fi to engage in a peer-to-peer data exchange with a power management device even though the smartphone network Wi-Fi was never intended to support on-demand, peer-to-peer communications.

Another advantage of configuring a power management device 200 with Wi-Fi Direct or having it simulate an access point is that it can be installed and used in situations where there is no Wi-Fi network available. This greatly extends the functionality of a power management device without reliance on a Wi-Fi network.

As smartphones continue to evolve, new models include Wi-Fi Direct support in addition to network Wi-Fi. In one preferred embodiment of the present disclosure, and without limiting the ability to use any other Wi-Fi Direct methods such as P2P autonomous group formation or P2P persistent group formation, power management device 200 and smartphone 10 utilize a P2P standard group formation method and negotiate a P2P group according to the Wi-Fi Direct specification. Power management device 200 and smartphone 10 preferably discover each other utilizing a process of scanning, finding and exchange of probe requests and probe responses leading to negotiation as to which device will assume the role of Group Owner in accordance with the Wi-Fi Alliance Wi-Fi Direct specification. Once a Group Owner has been negotiated, it will preferably beacon on a selected channel allowing a secure peer-to-peer communication link to be established through Wi-Fi protected setup provisioning and a Dynamic Host Configuration Protocol (DHCP) exchange to set up the internet protocol configuration.

The Wi-Fi Direct specification allows any Wi-Fi Direct device to be a Group Owner, and, depending on the capabilities of the device, the negotiation procedure determines the most suitable device to perform this role. In one preferred embodiment, power management device 200 is preferably configured with the highest priority Group Owner Intent Value to negotiate a Wi-Fi Direct connection as Group Owner. By operating as Group Owner, power management device 200 can maintain a number of simultaneous peer-to-peer connections in what is commonly referred to as a hub and spoke arrangement, although it may be desirable in some circumstances to limit the number of open connections to a 1:1 ratio.

In one preferred embodiment, power management device 200 is preferably configured to autonomously create a P2P group in immediately becoming the Group Owner. Through a beacon from power management device 200, other devices can discover the power management device's established group using traditional Wi-Fi scanning mechanisms, and then directly proceed with Wi-Fi protected setup provisioning and address configuration to join the group as a P2P Client. In this instance the negotiation of the Group Owner role between the smartphone 10 and power management device 200 is notionally resolved through the power management device 200 autonomously specifying its role as Group Owner.

In one preferred embodiment, where a power management device 200 and smartphone 10 have previously formed a Wi-Fi Direct communications link, power management device 200 and/or smartphone 10 can preferably declare a group as persistent by using a flag in the P2P capabilities attribute present in beacon frames, probe responses and/or Group Owner negotiation frames. In that way, the power management device and smartphone store network credentials and their assigned roles as a Group Owner or P2P Client for subsequent re-instantiations of the group. After the discovery phase, if power management device 200 or smartphone 10 recognizes that they have formed a persistent group with each other in the past, either power management device 200 or smartphone 10 can use the Wi-Fi Direct invitation procedure to quickly re-instantiate the group rather than re-negotiating which device will take on the Group Owner role.

In one preferred embodiment, it may be desirable for power management device 200 to disclose its services and/or identity prior to establishing a full communications connection. This preferably enables an app, such as the Product App, or smartphone operating system to search for and identify nearby power management devices via advertised services, thereby allowing the app or smartphone operating system to ignore other devices prior to establishing a communications link with a power management device, or identify power management devices with which a communications link could be formed, or trigger an action based on the discovery of a power management device's services and/or identity.

In one preferred embodiment, power management device 200 is preferably configured to support Neighbor Awareness Networking (NAN) or any other proximity based service discovery according to the Wi-Fi Alliance's technical specifications, including architecture, technologies, methodologies, protocols, standards or specifications for interoperability amongst Wi-Fi Aware™ devices. NAN or Wi-Fi proximity based service discovery allows smartphone 10 or an app, such as the Product App, to discover a power management device 200 and its capabilities through small service discovery messages and synchronize before making a full Wi-Fi connection via Wi-Fi Direct or network Wi-Fi. In that way, a smartphone's operating system, an application programming interface (API) or an app, such as the Product App, may preferably search for: and display relevant power management devices prior to establishing a communications link; recommend to a user, or automatically download, an appropriate app in order to control a power management device; and/or alert a user to, or automatically open, an appropriate app already installed on a smartphone in order to control a power management device. The foregoing is by way of example only and does not limit utilizing NAN or proximity based service discovery as a trigger for other suitable contextual actions. In one preferred embodiment, where power management device 200 is configured to support NAN or Wi-Fi proximity based service discovery, it may preferably be configured as a NAN Infrastructure Device with a high Master Preference value, for example greater than or equal to 128, or an equivalent.

In one preferred embodiment, power management device 200 may be configured to support multiple MAC entities. Where power management device 200 is configured to support multiple MAC entities, it may preferably operate as a NAN Concurrent Device and run concurrently in a NAN network while maintaining a separate communications link utilizing Wi-Fi Direct or network Wi-Fi.

In one preferred embodiment, power management device 200 is preferably configured to support Bluetooth proximity beaconing and may utilize Apple iBeacon, Google Eddystone or any other suitable profile or protocol for proximity based service and/or identity beaconing including any extensions, revisions or proprietary implementations. Where desirable, Bluetooth proximity beaconing may be configured so that power management device 200 does not accept any connections through a Bluetooth radio operating as a proximity beacon. Where a power management device 200 is configured with Bluetooth proximity beaconing, smartphone 10 operating system, a proximity beacon API, or an app, such as the Product App, can preferably utilize beacon information broadcast by power management device 200 as a trigger to initiate a proximity based action. By way of example, this may include: recommending to a user, or automatically downloading, an appropriate Product App in order to control a power management device; alerting a user to, or automatically opening, an appropriate Product App already installed on a smartphone in order to control a power management device; and/or listing in a Product App relevant nearby power management devices that can preferably be selected and controlled through the Product App.

While examples have been provided for Bluetooth and Wi-Fi, it can be appreciated that power management device 200 can be configured to preferably utilize any methodology, topology, technology, protocol, standard or specification for proximity based service discovery or beaconing without departing from the scope of the present invention. By way of example, Apple iBeacon or Google Eddystone may be adapted for different carrier mediums other than Bluetooth, such as Wi-Fi, so that power management device 200 may preferably be configured to support Apple iBeacon and/or Google Eddystone through Wi-Fi. In one preferred embodiment, service discovery information may include instructions or data that could be utilized by the Product App or power management device 200 to open a wireless communications link.

In one preferred embodiment, power management device 200 may preferably be configured to use the detection of a proximity beacon from another device as a trigger for executing a configurable or desirable action. By way of example, power management device 200 may be configured to activate a power control circuit or particular wireless communications on detection of a proximity beacon from smartphone 10.

System microcontroller 208 preferably incorporates a firmware program which defines the operation and functions of power management device 200 and assumes responsibility for controlling program code and system elements, including: specifying and controlling the operational modes of adaptable communications 202; control and interrogation of perpetual clock calendar 204; specifying and controlling the operational modes of local network communications 206; provisioning and controlling the operational modes of cellular communications 210; control and interrogation of power measurement 212; and control of any power control circuits such as relay 216 and relay 218. System microcontroller 208 preferably includes non-volatile memory to store any program and configuration data and any data received from a smartphone, the Product App, service platform, a third party, or appliance or device. In some preferred embodiments, non-volatile memory may be external to system microcontroller 208. In some preferred embodiments, more than one microcontroller may be used. System microcontroller 208 is preferably configured to store measurement data from power measurement 212 to the non-volatile memory and may preferably utilize a file management system where desirable. In one preferred embodiment, power management device 200 is preferably configured to use an MS-DOS FAT file system, such as FAT-12, implemented on a flash storage device.

When power management device 200 is manufactured, system microcontroller 208 preferably holds the firmware to operate power management device 200 as a network Wi-Fi device, Wi-Fi Direct device and/or SoftAP. When power is applied to a power management device 200 for the first time, system microcontroller 208 preferably starts adaptable communications 202 in a peer-to-peer mode allowing it to be discovered by a smartphone within wireless range.

It can be appreciated that a power management device operating as a Wi-Fi peer-to-peer device can communicate directly with a smartphone without needing a Wi-Fi WLAN access point. Power management device 200 preferably: simulates a Wi-Fi access point if smartphone 10 is not using Wi-Fi Direct to communicate; or negotiates with smartphone 10 a communication link according to Group Owner Intent Values, or as an autonomous Group Owner, if smartphone 10 is using Wi-Fi Direct to communicate. The user is then able to establish a peer-to-peer communications link and exchange data directly with the selected power management device without the need for any other device.

In one preferred embodiment, power management device 200 in a peer-to-peer mode is preferably configured to simulate a Wi-Fi access point or operate as a SoftAP without support for Wi-Fi Direct. In that case, a smartphone would preferably establish a peer-to-peer communications link with a power management device as if connecting as a client to a Wi-Fi access point, but could not negotiate with a power management device a Wi-Fi Direct connection even if smartphone 10 supported Wi-Fi Direct.

Where desirable, power management device 200 may be configured to operate as a SoftAP or Group Owner and communicate with one or more other power management devices connected to power management device 200 as a network client or P2P Client of power management device 200. A preferred method for configuring and controlling power management device 200 is through a related Product App. Installation instructions for the Product App are preferably included with the power management device. The Product App preferably adopts the same centralized app store installation methods commonly utilised by conventional smartphone platforms.

The Product App may communicate through any mix of wireless elements, radio technologies and communication channels to seamlessly provide the best communications link with a power management device 200. The Product App preferably controls smartphone 10 wireless communications in order to initiate, search and establish a wireless communications link with a power management device 200. The Product App may preferably display preconfigured and new power management devices via graphical elements on smartphone touch screen 12.

When the Product App starts, it preferably scans for power management devices and identifies any new power management device that needs to be initially configured. At this point, if a wireless peer-to-peer connection has not already been established between the smartphone and a new power management device, the Product App preferably allows the user to establish a wireless peer-to-peer connection with the desired power management device. Where supported by adaptable communications 202, the Product App preferably allows a user to determine if a power management device is to: operate in peer-to-peer mode and remain a Wi-Fi Direct group participant; simulate a Wi-Fi access point; operate in network Wi-Fi mode and connect to a WLAN as a client and become a network Wi-Fi device; or operate concurrently in a Wi-Fi peer-to-peer mode and network Wi-Fi mode.

In a situation where the smartphone operating system does not allow the Product App to control the smartphone wireless communications in order to establish a peer-to-peer link with a power management device, the user may use any mechanism provided by the smartphone to establish a peer-to-peer communication link with a power management device prior to starting the Product App. This could, by way of example, include accessing the smartphone Wi-Fi settings screen and manually selecting the SSID that corresponds to a power management device 200 and entering any information or passwords needed to connect to the power management device as the desired Wi-Fi network.

If the user wants a new power management device to run in a peer-to-peer mode, preferably utilizing Wi-Fi Direct or simulating a Wi-Fi access point, they preferably select this option in the Product App. The Product App then leads the user through a series of data inputs using the smartphone's touch screen 12 as a human interface. The Product App communicates with system microcontroller 208 and replaces the general parameters used for the initial connection to specific parameters which define the power management device as a unique product. These may include: setting a unique encryption key so all data transfers between the power management device and the smartphone are protected; setting the power management device or SSID name to a unique, easily recognisable identifier; and setting a password in the power management device used to establish a secure link with a smartphone. It can be appreciated that in certain circumstances it may be desirable to configure a power management device 200 without a password, thereby operating open or unsecured.

The Product App or smartphone operating system preferably maintains a record of these specific parameters in the smartphone memory for future identification of, and connection to, the configured power management device.

Once the setup procedure is complete, the Product App preferably commands the power management device firmware to reconfigure which may involve a "restart". When the applications firmware reconfigures, the power management device will use the specified data to populate and create its own unique identity. The smartphone which was used to set this identity will be able to connect to that power management device because the new specific parameters are known. Where the smartphone operating system allows, the Product App can then be used to preferably automatically establish a peer-to-peer communications link with the power management device each time the user selects that particular device in the Product App.

Once a power management device has been configured, any other smartphone can only connect if the user knows the specific parameters that are now unique to that particular power management device. If a second smartphone searches for Wi-Fi access points or Wi-Fi Direct devices, it will see the configured power management device with the characteristic that it is "secure" where a password has been set. To connect to it, the user will have to know the specific password allocated to that power management device, otherwise it will not be able to establish a communications link. If the password is known and entered into the smartphone when requested, a communication link between the second smartphone and the power management device will be established. The Product App is still preferably required to control the power management device and this may have additional security measures or security trust structures, such as passwords, keys, certificates and/or encryption depending on the nature of the application.

If, instead of configuring the newly installed power management device in peer-to-peer mode, the user chooses it to operate in network Wi-Fi mode, this is selected as the required option and the Product App preferably determines if there are one or more WLANs available for the power management device to connect to as a client through a scan or information provided by the smartphone's communications application interface. The Product App requests the user to confirm the preferred network and asks the user to confirm and/or input any necessary network parameters such as the network password so the power management device can connect to the chosen WLAN as a client.

The Product App communicates with system microcontroller 208 and sets the parameters needed for the power management device to establish itself as a network Wi-Fi client which may include any parameters that uniquely identify the power management device on a network. When all of the appropriate parameters are known and updated, the Product App preferably commands the power management device to enable its firmware as a network Wi-Fi device which may involve a "restart". The power management device then connects to the WLAN as a client and is accessible by the smartphone Product App via the WLAN access point. The power management device running as a network Wi-Fi client can then be controlled by other smartphones and computers on the same WLAN or remotely through the internet. In one preferred embodiment, it may be desirable for the power management device to include additional security measures such as password protection, a socket layer within the Product App, security keys or certificates, encryption, a hardware authorization chip, or other measures or trust structures to prevent the power management device being controlled by other devices through the network without authorization.

A power management device preferably includes any necessary networking protocols to assist in discovery on a network or peer-to-peer, which may include one or more of: Bonjour, Simple Service Discovery Protocol (SSDP), Bluetooth® Service Discovery Protocol (SDP), DNS service discovery (DNS/DNS-SD), Dynamic Host Configuration Protocol (DHCP), Internet Storage Name Service (iSNS), Jini for Java objects, Service Location Protocol (SLP), Session Announcement Protocol (SAP) for RTP sessions, Simple Service Discovery Protocol (SSDP) for Universal Plug and Play (UPnP), Universal Description Discovery and Integration (UDDI) for web services, Web Proxy Autodiscovery protocol (WPAD), Web Services Dynamic Discovery (WS-Discovery), XMPP Service Discovery (XEP-0030), and/or XRDS for XRI, OpenID, OAuth, etc.

Preferably, where the smartphone is configured to determine from a power management device's wireless signal, or during service discovery, that a power management device is a new wireless device that can be configured as a WLAN network client, the smartphone operating system, an API, an app or Product App preferably allows a user to automatically input the necessary network parameters of a known WLAN from the smartphone's memory into the power management device wirelessly using a peer-to-peer communications link to configure the power management device as a network client of the known WLAN. The smartphone may also be able to determine from a power management device's wireless signal, or during service discovery, a product identifier preferably allowing the smartphone to automatically download, or direct a user to, the power management device's related Product App from the appropriate App store.

In one preferred embodiment, power management device 200 may be configured to support Apple Wireless Accessory Configuration, including any related software, firmware or hardware authentication required to establish a secure peer-to-peer Wi-Fi communications link between power management device 200 and smartphone 10 used to automatically configure power management device 200 as a client of a known Wi-Fi network. Where desirable, power management device 200 and the Product App may preferably be configured to support Apple HomeKit.

Once a power management device has been configured as a Wi-Fi Direct device, simulated Wi-Fi access point or a network Wi-Fi device, it preferably continues to operate in that mode even after it has been powered off and then on again. All of the specific operating parameters for each mode are preferably saved in the non-volatile memory and are retained if power is removed. When power is restored, system microcontroller 208 powers up the same Wi-Fi mode that was running before power was removed, and the appropriate firmware and operating parameters are restored from non-volatile memory. It can be appreciated that where adaptable communications 202 has its own dedicated microcontroller, the Wi-Fi mode and the appropriate firmware and operating parameters may be restored from non-volatile memory by the adaptable communications 202 microcontroller rather than system microcontroller 208.

There are applications where a power management device running concurrent peer-to-peer and network Wi-Fi capabilities is desirable. In this situation, the user via the Product App may activate both modes, allowing either mode to be used. Equally, the user, via the Product App, can choose to disable one of the modes, or can change from a peer-to-peer mode to network Wi-Fi mode, or vice versa, as desired. Concurrent peer-to-peer and network Wi-Fi capabilities may be configured according to the desired security requirements of a particular application. By way of example, where power management device 200 operates a network WLAN and peer-to-peer connection concurrently, power management device 200 may allow third parties to control or access functions via the peer-to-peer connection without allowing access to the concurrent WLAN connection, thus preventing access to other WLAN devices. This may be particularly useful where a technician needs to trouble shoot a power management device and can do so peer-to-peer without needing access to the WLAN. Alternately, power management device 200 may allow remote monitoring of the system or data exchange via the network WLAN connection while limiting actual control of the system to a peer-to-peer connection.

Each time a communications mode is configured or changed, the new parameters are preferably retained by system microcontroller 208 in the event power is disconnected or lost. When power is restored, system microcontroller 208 powers up in the same mode as previously operating before power was removed, and the appropriate operating parameters are restored from the non-volatile memory. In that way, system microcontroller 208 preferably is configured with an adapted default setting that can be restored from the non-volatile memory. In one preferred embodiment, operating parameters for adaptable communications 202 may preferably be stored and reinitialized by a microcontroller in adaptable communications 202. It can be appreciated that the operating parameters for local network communications 206, cellular communications 210 or any other communications network could also be preferably stored and reinitialized by a dedicated microcontroller rather than system microcontroller 208. It is envisaged that there may be times when a power management device, or a sub-system, needs to be completely reset. The Product App is preferably able to communicate with a power management device and command it to re-initialise, or re-initialise a sub-system, to the factory default configuration. In this case, all user-defined parameters that were loaded into the power management device are lost and it is returned to its factory default state, ready to receive new user-defined parameters.

A power management device may incorporate a human interface in the form of a switch(s), button(s), capacitive/proximity touch pad(s) or accelerometer configured to detect a tap or knock, which the user could use to cause the power management device to: perform a control function; re-initialise to the factory default configuration without the use of a smartphone or Product App; reboot the system; or assist in establishing a communications link, such as initializing a Wi-Fi Protected Setup. In one preferred embodiment, the power management device may be configured to accept a command via adaptable communications 202, local network communications 206 or cellular communications 210 causing it to re-initialize to the factory default configuration without the direct wireless use of a smartphone or Product App on the smartphone. Where desired, a power management device may be configured for operation without any manual inputs on the device itself.

In one preferred embodiment, a button, switch, capacitive/proximity touch pad or accelerometer configured to detect a tap or knock may be used to activate a wireless communications system of power management device 200 rather than have that wireless communications system run continuously drawing power. By way of example, a button may be used to activate adaptable communications 202 where a user wishes to establish a peer-to-peer wireless communications link.

In one preferred embodiment, adaptable communications 202 may include Bluetooth capabilities in addition to, or instead of, peer-to-peer Wi-Fi and network Wi-Fi capabilities. A peer-to-peer Bluetooth communication link between smartphone 10 and power management device 200 may be used by the Product App to enter parameters for: establishing or opening a peer-to-peer Wi-Fi, Wi-Fi Direct or network Wi-Fi communications link; establishing or opening a local network communications link; and/or provisioning a cellular data or low power wide area network link. A Bluetooth communication link may in its own right operate as a peer-to-peer communications link for the exchange of data between the Product App and power management device 200. The Product App, the smartphone operating system, an API, another app or a human interface on power management device 200 in the form of touch pad(s), button(s), switch(s), accelerometer configured to detect a tap or knock or sound transducer(s) may facilitate the establishment of a Bluetooth peer-to-peer connection between power management device 200 and smartphone 10. The Product App may be configured to allow a user to specify Bluetooth as the preferred peer-to-peer communication method between a power management device 200 and smartphone 10. The Bluetooth connection preferably utilizes the secure transmission methods and protocols native to the chosen Bluetooth standard.

Where smartphone 10 and power management device 200 use a proprietary implementation of peer-to-peer Wi-Fi or an adaptation of Wi-Fi Direct, power management device 200 and smartphone 10 are preferably configured to use the handshake, negotiation methods, protocols, standards, specifications and configuration requirements particular to that proprietary implementation of peer-to-peer Wi-Fi or adaptation of Wi-Fi Direct, and may incorporate any hardware, software, firmware or authentication schemes necessary, and may use Bluetooth to facilitate the establishment of a peer-to-peer Wi-Fi communication link where desirable.

In a preferred form of the present disclosure, a communications link or mode utilising the ad-hoc Independent Basic Service Set (IBSS) mode of IEEE 802.11 (as commonly understood by those of ordinary skill in the art) is hereby expressly excluded.

In one preferred embodiment, the power management device may include NFC capability that the smartphone operating system, API or an app, such as the Product App, could use when first communicating with a new power management device to automatically establish a network Wi-Fi, peer-to-peer Wi-Fi, Wi-Fi Direct, Bluetooth or other communications link on smartphones that support NFC. This process is commonly referred to as "bootstrapping" and is an established method for initializing communications familiar to those skilled in the art.

In one preferred embodiment, adaptable communications 202 may preferably be configured to support an IEEE 802.11 protocol or standard for sub-1 GHz wireless communications, such as 802.11ah or Wi-Fi HaLow, in addition to, or instead of, an IEEE 802.11 protocol or standard for 2.4 GHz, 5 GHz and/or 60 GHz, such as 802.11a/b/g/n/ac/ad. Without limiting any other network configurations enabled by a chosen protocol or standard, where adaptable communications 202 supports an IEEE 802.11 protocol or standard for sub-1 GHz wireless communications, power management device 200 may preferably be configured to operate as a relay access point such as in a two-hop or multi-hop network structure.

Referring back to FIG. 2, in one preferred embodiment, local network communications 206 preferably includes any combination and number of integrated circuits, components, controllers, transceivers, radios, aerials, memory, microprocessors, SiPs, PoPs, or SoCs that allow system microcontroller 208 to communicate with other devices in a PAN or HAN via any suitable wireless PAN or HAN protocol, standard, application profile or specification, including one or more of: any ZigBee protocol, standard, application profile or specification published by the ZigBee Alliance; any ANT protocol, standard or specification; any protocol, standard or specification published by the WI-SUN Alliance; any Thread protocol, standard or specification published by the Thread Group Alliance; any Z-Wave protocol, standard or specification; and/or any protocol, standard or specification based on IEEE 802.15 including, but not limited to, IEEE 802.15.4; including any amendments, extensions, subsets, revisions or proprietary implementations. An aerial 206a, or aerials, may be added as needed.

Local network communications 206 may be configured to utilize a ZigBee Alliance Smart Energy, Home Automation or aggregated profile (such as ZigBee 3.X or later) protocol, standard, application profile or specification where desirable.

In one preferred embodiment, and without limiting the ability to use any other network topologies or a particular wireless PAN or HAN protocol, standard, application profile, specification, methodology or authoring scheme, power management device 200 may preferably be configured by the Product App or a service platform to operate as a ZigBee network coordinator, router, end device, full function device, reduced function device or participant of a particular ZigBee network. Using a wireless communication link between smartphone 10 or service platform and power management device 200, a user is preferably able to configure, manage and control any ZigBee network capabilities of power management device 200 including: joining an existing wireless ZigBee network; coordinating a wireless ZigBee network; initiating a wireless ZigBee network; or facilitating other ZigBee products in joining a ZigBee network. By way of example, power management device 200, through the Product App, may be configured by a user to join a ZigBee Smart Energy network coordinated by a smart meter as a router or end device. Additionally or alternatively, power management device 200, through the Product App, may be configured by a user to coordinate a ZigBee Home Automation network for home automation devices or appliances to join.

Because smart meters communicate across the power network through an advanced metering infrastructure that involves both personal data and data relating to the power grid, security of the network remains paramount. In one preferred embodiment, and without limiting the ability to use any other application profile, protocol, specification or standard, power management device 200 is preferably configured to establish a secure communications link utilizing the trust structures and authoring methods of ZigBee Smart Energy.

By way of example, a smart meter is usually configured as a ZigBee Smart Energy coordinator and Trust Centre responsible for generation of the network key and managing the access of nodes to its Smart Energy HAN within a building, apartment or installation. In that case, power management device 200 may preferably be configured as a ZigBee Smart Energy node and embedded during manufacture with a link key and a Smart Energy security certificate. The link key and security certificate are preferably stored in non-volatile memory in power management device 200.

In one preferred embodiment, where power management device 200 is configured with a Smart Energy PAN or HAN it may preferably be assigned an installation code. The installation code preferably includes 12, 16, 24, 32 or another suitable number of hex digits followed by a 4-digit checksum. The leading digits are preferably used to algorithmically derive the link key stored in non-volatile memory within power management device.

Power management device 200 preferably has an IEEE/MAC address that corresponds to its ZigBee Smart Energy PAN or HAN. The Smart Energy IEEE/MAC address of power management device 200 is preferably reported by microcontroller 208 or local network communications 206.

The installation code and/or Smart Energy IEEE/MAC address of power management device 200 may be recorded on the physical unit, or in paperwork, or an electronic format such as embedded in non-volatile memory of power management device 200 ready for automatic transfer to the Product App. The installation code and/or Smart Energy IEEE/MAC may be recorded in a visually readable from, such as QR code or barcode, allowing the Product App to utilize the smartphone camera to scan and automatically populate the Product App. It can be appreciated that a visually readable code may also contain additional information about the functional capability of power management device 200, allowing the Product App to automatically associate and expose relevant controls for the functional capabilities during configuration. In one preferred embodiment, instead of, or in addition to a visually readable code, power management device 200 may be configured with proximity beaconing or NFC capability allowing for the transfer of the installation code and/or Smart Energy IEEE/MAC and any additional information to the Product App using wireless or near field communications where supported by the smartphone. The installation code and/or Smart Energy IEEE/MAC may be manually entered into the Product App.

In one preferred embodiment, a smart meter may preferably be affixed with an identification code. The identification code may be recorded on the physical unit, or in paperwork. The identification code may be recorded in a visually readable from, such as QR code or barcode, allowing the Product App to utilize the smartphone camera to scan and automatically populate the Product App. It can be appreciated that a visually readable code may also contain additional information about the functional capability of a smart meter, allowing the Product App to automatically associate and expose relevant controls for the functional capabilities during configuration. In one preferred embodiment, instead of, or in addition to a visually readable code, a smart meter may be configured with proximity beaconing or NFC capability allowing for the transfer of the identification code and any additional information to the Product App using wireless or near field communications where supported by the smartphone. The identification code may be manually entered into the Product App.

In order to establish a secure communications link, power management device 200 and a smart meter need to be placed into a secure pairing mode allowing for a multistep exchange of security keys and certificates.

In one preferred embodiment, after the initial configuration of a wireless communications link between smartphone 10 and power management device 200, the Product App is preferably configured to interrogate a power management device 200 configured with a Smart Energy PAN or HAN and determine if it has joined a Smart Energy network such as one coordinated by a smart meter. If not, the Product App preferably exposes the option to begin pairing power management device 200 with an available Smart Energy network. If a user chooses to initiate pairing, the Product App preferably automatically extracts the installation code and Smart Energy IEEE/MAC address from the non-volatile memory of power management device 200 through a wireless communications link with power management device 200, which may be by way of a peer-to-peer Wi-Fi, network Wi-Fi, Bluetooth, cellular data or LPWA wireless communications link. In order to associate power management device 200 with the desired smart meter, the Product App is preferably configured to either read, or accept manual input of, the identification code of the smart meter. It can be appreciated that the Product App may automatically extract the installation code and Smart Energy IEEE/MAC address from the non-volatile memory of power management device 200 on first establishing a communications link rather than after the initiation of a pairing procedure without departing from the scope of the present disclosure.

Once the Product App has the installation code and Smart Energy IEEE/MAC address of power management device 200 and the identification code of the smart meter, the Product App preferably opens a communications channel with the user's utility or provider responsible for managing the smart meter's communications hub and requests that the smart meter be configured to pair with power management device 200. The Product App preferably transfers the installation code, Smart Energy IEEE/MAC address and identification code to the utility or communications hub manager as part of this procedure. It can be appreciated that a service platform may be utilized to facilitate communications between the Product App and utility or communications hub manager without departing from the scope of the present disclosure.

In one preferred embodiment, power management device's security certificate, or information derived from power management device's security certificate, may preferably be automatically extracted by the Product App from power management device 200 and transferred to a utility or communications hub manager as part of the pairing request procedure.

Upon receipt of the pairing request, a utility or communications hub manager preferably utilizes the identification code to identify and address the target smart meter on the advanced metering infrastructure or smart energy wide area network. Utilizing the installation code, the utility or communications hub manager preferably algorithmically derives the pre-configured link key associated with, and stored within, power management device 200. Using the advanced metering infrastructure or smart energy wide area network to communicate with the target smart meter, the utility or communications hub manager preferably installs power management device's link key and Smart Energy IEEE/MAC address into the smart meter and puts it into pairing mode. The utility or communications hub manager may transfer the security certificate, or information derived from the security certificate, or a key associated with the security certificate, to the smart meter as required.

In one preferred embodiment, the Product App may automatically direct microcontroller 208 to put a ZigBee Smart Energy PAN or HAN of local network communications 206 into pairing mode after sending a pairing request to a utility or communications hub manager. In one preferred embodiment, the Product App may be configured to receive a notification from a utility or communications hub manager that the user should put power management device 200 into pairing mode for connection to a smart meter, the Product App preferably exposing a user interface that can be used to cause the Product App to direct microcontroller 208, utilizing any available communications channel between smartphone 10 and power management device 200, to put a ZigBee Smart Energy PAN or HAN of local network communications 206 into pairing mode. In one preferred embodiment, a utility or communications hub manager may direct microcontroller 208 to put a ZigBee Smart Energy PAN or HAN of local network communications 206 into pairing mode using any available communication pathway with power management device 200.

During pairing, power management device 200 preferably transmits a joining request to the smart meter on the ZigBee Smart Energy network coordinated by the smart meter. The smart meter preferably utilizes power management device's link key, and where necessary Smart Energy IEEE/MAC address, to provide power management device 200 with a network key encrypted using power management device's link key. Power management device 200 preferably utilizes the network key to encrypt a sequence of communications with the smart meter to generate an application link key, the process of which may include an exchange of security certificates. The application link key can then be used to encrypt communications between power management device 200 and the smart meter, with power management device having then joined the ZigBee Smart Energy network of the desired smart meter.

In one preferred embodiment, where power management device 200 participates in a ZigBee Smart Energy network coordinated by a smart meter, power management device 200 is preferably able to communicate with other devices on the ZigBee Smart Energy network allowing the Product App to exchange data with devices other than a smart meter. By way of example, power management device 200 may preferably communicate with a gas meter configured as node of a smart meter in a dual-fuel meter arrangement such as under the United Kingdom Department of Energy & Climate Change Smart Metering Equipment Technical Specification.

In one preferred embodiment, in addition to, or instead of using a Product App, the ZigBee networking of a power management device can preferably make use of any mechanism available in a chosen ZigBee wireless protocol, standard, application profile or specification for initiating, joining or coordinating a network. By way of example, a human interface such as a switch, button or touch pad on a power management device, and/or an appliance or device in a Zigbee PAN or HAN network could be used to initiate a pairing mode for the exchange of any security, trust, or networking credentials required for power management device to join a ZigBee network coordinated by another appliance or device, or for other appliances or devices to join a ZigBee network coordinated by the power management device, the methods of which would be understood by those of ordinary skill in the art.

It is understood that some ZigBee networks operate without a coordinator. The authoring of a power management device onto a coordinator-less ZigBee network, or to initiate a coordinator-less ZigBee network, may preferably make use of any mechanism available in the chosen ZigBee wireless protocol, standard, application profile or specification for joining or initiating a coordinator-less network. By way of example, a power management device may initiate or be added to a ZigBee Light Link network using the ZigBee Touchlink configuration mechanism, the methods of which would be understood by those of ordinary skill in the art. In one preferred embodiment, a ZigBee Touchlink configuration of power management device 200 may be managed through the Product App.

In one preferred embodiment, a service platform may be used to preferably configure a power management device 200 to participate in a ZigBee Smart Energy network using any available communications pathway outlined in FIG. 4. Where desirable, remote configuration of a power management device 200 onto a Smart Energy network may not require user participation in the configuration process or interaction with power management device 200 other than to power it on and, where desirable, press a button to commence configuration.

The organic growth of ZigBee over a number of years has resulted in the adoption and development of a number of different ZigBee standards, application profiles, and specifications to meet the needs of particular industries. By way of example, ZigBee Smart Energy has evolved into a specific implementation of ZigBee for the utility industry with a level of complexity and number of security and trust structures not particularly suited to simple home automation. For that reason, specific implementations of ZigBee have developed for home automation, such as ZigBee Home Automation and ZigBee Light Link. It can therefore be appreciated that it may be highly desirable for a power management device to participate in more than one ZigBee network simultaneously or concurrently in order to maximize the power management device's capabilities and interoperability with other automation devices and smart meters.

In one preferred embodiment, local network communications 206 preferably includes any combination and number of integrated circuits, components, controllers, transceivers, radios, memory, microprocessors, and aerials to provide more than one wireless PAN or HAN, for example, ZigBee, running simultaneously or concurrently, where each of the simultaneous or concurrent ZigBee networks are preferably capable of communicating using a different ZigBee standard, application profile, specification, topology or access scheme where desirable. It will be understood by those of ordinary skill in the art that a ZigBee network can be configured with more than one application profile. In one preferred embodiment, local network communications 206 preferably utilizes a single IEEE 802.15.4 radio configured with multiple application profiles, or a version of ZigBee that amalgamates various ZigBee standards into a single unified standard such as ZigBee 3.0 or later. Where local network communications 206 utilizes a unified standard of ZigBee, such as ZigBee 3.0 or later, it may preferably include security measures specifically implemented to support ZigBee Smart Energy such as additional security based on elliptical curve cryptography. Suitable ZigBee standards, application profiles, or specifications that local network communications 206 may adopt include: ZigBee Home Automation; ZigBee Light Link; ZigBee Smart Energy; ZigBee RF4CE; ZigBee IP; ZigBee Pro; ZigBee 2.X; ZigBee 3.X; IEEE 802.15.4; including derivative, contemporary or proprietary implementations.

In one preferred embodiment, where local network communications 206 includes support for ZigBee, and it is desirable for a power management device to participate in two ZigBee networks at the same time, local network communications 206 is preferably configured with a dual-network capable SoC, PoP or SiP having a single IEEE 802.15.4 radio configured to participate in two ZigBee networks by maintaining two sets of network parameters operated through manual or automatic switching modes. A dual-network capable SoC, PoP or SiP preferably includes synchronization between networks optimized for co-existence. Power management device 200 is preferably able to operate as a ZigBee coordinator, router, end device or participant on each network depending on the desired topology of the network. By way of example, power management device 200 could be configured to participate in a ZigBee Smart Energy network coordinated by a smart meter as a router or end device, while at the same time configured to coordinate a ZigBee Home Automation network allowing for the control of attached home automation devices through instructions from the Product App or a service platform. It can be appreciated that this allows the security and integrity of a ZigBee Smart Energy network coordinated by a smart meter to be maintained at a high level, while allowing the Product App or a service platform to control general home automation devices on a separate network through the power management device operating as a coordinator of a ZigBee Home Automation network.

In one preferred embodiment, and without limiting any communication paths afforded by the mix of wireless and wired communications technologies configured in a power management device, where power management device 200 is configured with dual-network ZigBee communications, local network communications 206 or system microcontroller 208 can preferably transpose, route or otherwise facilitate the migration of control, command, configuration and other data between ZigBee networks. In that way, and by way of example only, a demand response signal or tariff variation from a smart meter propagated onto a ZigBee Smart Energy network in which power management device 200 is a participant, could be propagated by power management device 200 onto a ZigBee Home Automation network in which power management device 200 is also a participant, allowing other home automation devices to receive and respond to the demand response signal or tariff variation even though they may not be part of the Smart Energy network. By way of another example, power management device 200 could receive a demand response signal or tariff variation on a ZigBee Smart Energy network and issue a command to a home automation device or devices on a ZigBee Home Automation network causing a desired response.

In one preferred embodiment, where power management device 200 is configured with dual-network ZigBee communications, each ZigBee PAN may preferably be isolated from the other and not allow data to route internally between the ZigBee PANs within power management device 200. In that way, and by way of example only, power management device 200 participating in a ZigBee Home Automation network and a ZigBee Smart Energy network, may preferably not internally route, transpose or migrate data (such as a demand response signal) from the Smart Energy network onto the ZigBee Home Automation network. By way of another example, power management device 200 participating in a ZigBee Smart Energy network and a ZigBee Home Automation network may preferably not internally route, transpose or migrate data generated by a home automation device onto the ZigBee Smart Energy network such as device identifiers, status, and state data. Through this mechanism, power management device 200 may be configured to operate discretely as two separate PANs, allowing users to build and maintain a two local communication networks independently and not having the security or trust measures of one PAN affecting the other. While it may be preferable in some embodiments not to route data between ZigBee PANs internally within power management device 200, this should not be taken to limit the possibility of data being received by power management device 200 on one ZigBee network, sending that data to a service platform, receiving data back from the service platform and routing, transposing or migrating that data onto the other ZigBee network where desirable.

In one preferred embodiment, power management device 200 may be configured as an end device or reduced function device without router capabilities on a ZigBee Smart Energy network.

It can be appreciated that a dual-network ZigBee architecture may be enabled in a power management device by means other than a single IEEE 802.15.4 radio, dual-network capable SoC, PoP or SiP without departing from the scope of the present disclosure. In one preferred embodiment, a dual-network ZigBee communications architecture may preferably be configured using two single radio SiPs, PoPs or SoCs, each configured to individually run a different ZigBee network under the control of a master microcontroller, such as system microcontroller 208. In another preferred embodiment, a dual-network ZigBee communications architecture may preferably be configured using a microcontroller configured to operate two separate radios through a communication interface. In another preferred embodiment, a dual-network ZigBee communications architecture may preferably be configured using a SiP, PoP or SoC and single IEEE 802.15.4 radio with a microcontroller configured to operate two networks simultaneously or concurrently in software. It will be appreciated that these are merely examples and not intended to limit the implementation of a dual-network ZigBee architecture in power management device 200, which may utilize any suitable means and technologies available.

In one preferred embodiment, local network communications 206 could be configured with the necessary circuitry to enable a Thread and/or Z-Wave network in conjunction with dual-network ZigBee communications, or local network communications 206 could be configured with a Thread and/or Z-Wave network in conjunction with a single ZigBee network.

The ZigBee standards and specifications define a comprehensive security architecture and trust management model, which includes encryption, authentication and integrity at each layer of the ZigBee protocol stack, any element of which may preferably be utilized for ZigBee communications between a power management device and appliances or devices within a PAN or HAN network.

Where desirable, local network communications 206 may be configured to allow two or more power management devices 200 to communicate with each other through a PAN or HAN network.

Where desirable, a power management device 200 may be configured with power line communications instead of, or in addition to, local network communications 206.

Referring back to FIG. 2, cellular communications 210 preferably includes the necessary hardware, circuitry and SIM to support wireless telecommunication via a cellular or mobile broadband modem and is configured to support one or more wireless communication technology, protocol, standard or specification, such as International Mobile Telecommunications-2000 (IMT-2000), General Packet Radio Service (GPRS), Code Division Multiple Access (CDMA), CDMA2000, Global System for Mobiles (GSM), Time Division-Code Division Multiple Access (TD-CDMA), Time Division-Synchronous Code Division Multiple Access (TD-SCDMA), Enhanced Data rates for GSM Evolution (EDGE), Evolved EDGE, High-Speed Packet Access (HSPA), Evolved High-Speed Packet Access (HSPA+), Wideband Code Division Multiple Access (WCDMA), Universal Mobile Telecommunications System (UMTS), High Capacity Spatial Division Multiple Access (HC-SDMA), High Performance Radio Metropolitan Area Network (hiperMAN), Worldwide Interoperability for Microwave Access (WiMAX), WiMAX-Advanced, Long-Term Evolution (LTE), LTE-Advanced, TD-LTE LTE-MTC (Long-Term Evolution-Machine Type Communication), IMT-Advanced, 5th generation mobile networks or 5th generation wireless systems (5G).

In one preferred embodiment cellular communications 210 is preferably configured with an embedded SIM such as an embedded Universal Integrated Circuit Card (eUICC) soldered onto the motherboard of power management device 200. In one preferred embodiment, the ability for a Mobile Network Operator (MNO) to provide a removable SIM pre-configured with a communications profile, such a Mobile Subscriber ISDN and International Mobile Subscriber Identity (IMSI) that can be physically inserted into power management device 200 is hereby expressly excluded.

Where a power management device 200 is configured with cellular communications 210 it is also preferably configured with adaptable communications 202 providing a wireless communications link between smartphone 10 and power management device 200 that can be used by the Product App to provision cellular communications 210 onto a cellular network. Cellular communications 210 preferably includes the capability to provision over the air and, without limiting the ability to utilize other appropriate specifications or standards, may adopt the GSMA Embedded SIM Specification or Embedded SIM Remote Provisioning Architecture, including their contemporaries, or an equivalent published by the European Telecommunications Standards Institute (ETSI), including any amendments, extensions or proprietary implementations.

When power is first applied to power management device 200, cellular communications 210 preferably operates in a dormant or standby state. This allows a power management device 200 to be manufactured and distributed with cellular communication capabilities, but allows a user to decide whether or not to enable those cellular communication capabilities. Where a cellular connection is desirable, a user through the Product App in communication with system microcontroller 208 preferably directs cellular communications 210 to initialize and assume an active state. In one preferred embodiment a human interface on power management device 200 may be used to activate cellular communications 210 from a dormant or standby state.

It can be appreciated that the ability to communicate with a power management device 200 via cellular communications may require a service arrangement, contract or subscription with an MNO providing the cellular or mobile broadband data infrastructure. In one preferred embodiment a user through the Product App may preferably activate, accept or enter into a service contract or subscription with an MNO for a new power management device 200, or may add a new power management device 200 to an existing service contract or subscription. The Product App may utilize a service platform in offering or executing a service contract or subscription with an MNO.

Where a power management device 200 is configured with an embedded SIM, it is preferably configured with a means to identify it as a unique product, such as an identification code or codes that implicitly or explicitly identify power management device 200 or the embedded SIM of cellular communications 210 so that an MNO can associate a power management device 200 with a service contract or subscription. Such identification could be by way of an Integrated Circuit Card ID (ICCID), IMSI, Mobile Station International Subscriber Directory Number (MSISDN), Network Access Application, Universal Subscriber Identity Module (USIM), Integrated Circuit Card Identifier (ICCID), eUICC-ID, personalization data, provisioning profile data and/or operational profile data. An identification code may be recorded on the physical unit of a power management device 200, or in paperwork, or an electronic format such as embedded in non-volatile memory of power management device 200 and accessible to the Product App. An identification code may be recorded in a visually readable from, such as QR code or barcode, allowing the Product App to utilize the smartphone camera to scan and automatically populate the Product App. It can be appreciated that a visually readable code may also contain additional information about the functional capability of power management device 200, allowing the Product App to automatically associate and expose relevant controls for the functional capabilities during configuration or enable/load a particular provisioning or operational profile. In one preferred embodiment, instead of, or in addition to a visually readable code, power management device 200 may be configured with a proximity beacon or NFC capability allowing for the transfer of an identification code to the Product App using wireless or near field communications where supported by the smartphone. An identification code may be manually entered into the Product App. Where desirable, an identification code or codes may preferably be transferred from the Product App to an MNO or subscription manager during a request to provision a power management device 200 onto a cellular or mobile broadband network.

In one preferred embodiment, a power management device 200 may be configured for use on the network of a particular MNO with the embedded SIM of cellular communications 210 preferably configured with a provisioning profile or operational profile for that specific MNO. The Product App preferably allows a user to command cellular communications 210 to commence provisioning, cellular communications 210 utilizing the provisioning profile or operational profile to connect to the specified MNO network and preferably download, install and/or enable the operational profile for that MNO, which may include updating the eUICC information set.

In one preferred embodiment, a power management device 200 may be configured as generic product with the embedded SIM of cellular communications 210 preferably configured with a provisioning profile. It can be appreciated that more than one MNO could provide cellular or mobile broadband data infrastructure in a particular region. The Product App preferably allows a user to choose a target MNO and command cellular communications 210 to commence provisioning. In one preferred embodiment, the Product App may be configured to automatically select the target MNO based on the outcome of entering into a service contract or subscription with an MNO or third party provider through the Product App. In one preferred embodiment, the Product App may be directed by a service platform to automatically select a target MNO. The Product App is preferably configured to only expose options for MNOs in the immediate location and may utilize any global positioning technologies available in smartphone 10 to determine an accurate location. In one preferred embodiment the Product App may utilize the cellular services of smartphone 10 to scan for and present available MNOs to a user. In one preferred embodiment the Product App in communication with power management device 200 may preferably command cellular communications 210 to perform a scan and report available MNOs to the Product App for presentation to a user.

In order to provision an embedded SIM of cellular communications 210 over the air onto the network of a target MNO, cellular communications 210 is preferably configured to utilize a cellular or mobile broadband data connection of a provisioning MNO in order to download, install and enable an operational profile for the target MNO which may, or may not, be the MNO providing the provisioning cellular or mobile broadband data connection.

Where the target MNO is the provisioning MNO, cellular communications 210 preferably utilizes a provisioning profile to connect to the provisioning MNO network and downloads, installs and enables an operational profile for the provisioning MNO, which may include updating the eUICC information set.

Where the target MNO is not the provisioning MNO, the Product App preferably instructs the provisioning MNO of the target MNO by utilizing an available communications channel of smartphone 10, such as a network Wi-Fi or cellular data connection. Where necessary, communication to a provisioning MNO may utilize a service platform. Cellular communications 210 preferably utilizes a provisioning profile to connect to a provisioning MNO network, the provisioning MNO preferably issuing a switch instruction to a subscription manager outlining the migration of a power management device from the provisioning MNO network to the specified target MNO network, the subscription manager preferably facilitating the download and installation of an operational profile for the target MNO into the embedded SIM of cellular communications 210 and commanding the embedded SIM to enable the operational profile of the target MNO which preferably includes disabling any other profiles in the embedded SIM. Cellular communications 210 preferably utilizes the new operating profile of the target MNO to then connect to the cellular or mobile broadband data network of the target MNO. It can be appreciated that the same steps could be executed by preferably utilizing an operational profile of a provisioning MNO instead of a provisioning profile. In one preferred embodiment, the Product App preferably instructs a subscription manager as well as, or instead of, the provisioning MNO of a switch to a target MNO. In that case the provisioning MNO may not need to issue a switching instruction to the subscription manager where a message from the Product App can fulfil the role of a switching instruction to the subscription manager. In one preferred embodiment, the Product App may advise a target MNO of the desire to provision a power management device onto the network of the target MNO, the target MNO preferably issuing a switching instruction to a subscription manager or instructing the provisioning MNO to issue a switching instruction to a subscription manager rather than the Product App instructing the provisioning MNO.

In one preferred embodiment, cellular communications 210 may be configured with more than one provisioning or operational profiles. Where cellular communications 210 is configured with more than one provisioning profile, a user through the Product App may preferably choose which provisioning profile cellular communications 210 should use in provisioning power management device 200.

It can be appreciated that a provisioning subscription or service contract with a provisioning MNO may be required in order to utilize a cellular or mobile broadband data connection of the provisioning MNO and that a number of different parties could enter into a service contract or provisioning subscription without departing from the scope of the present disclosure. By way of example, a manufacturer or distributor of power management device 200 may preferably contract or enter into a provisioning subscription with a provisioning MNO. By way of another example, a company offering or utilizing power management devices may preferably contract or enter into a provisioning subscription with a provisioning MNO.

A user may wish to move a power management device from a current MNO to an alternate MNO. Where desirable, the Product App may be used to preferably initiate the process of migrating a power management device 200 from one MNO to another. In one preferred embodiment, a user preferably enters into a service contract or subscription with an alternate MNO and through the Product App instructs the alternate MNO to migrate a power management device 200 onto their cellular or mobile broadband network. The alternate MNO preferably initiates the provisioning of power management device 200 onto their cellular or mobile broadband data network over the air by issuing a switching instruction to a subscription manager or instructing the current MNO to issue a switching instruction to a subscription manager. Where the embedded SIM of cellular communications 210 does not contain an operational profile for the alternate MNO, the current MNO cellular or mobile broadband data network preferably allows the operational profile for the alternate MNO to be downloaded and enabled, disabling the current MNO operational profile and where desirable deleting it and removing its container from the embedded SIM. Where the embedded SIM of cellular communications 210 contains a disabled operational profile for the alternate MNO, the current MNO cellular or mobile broadband data network preferably allows a subscription manager to enable the operational profile for the alternate MNO and disable the current MNO operational profile and where desirable delete it and remove its container from the embedded SIM.

It can be appreciated that the provisioning of a power management device 200 onto a cellular or mobile broadband data network can be modified in a number of ways without departing from the scope of the present disclosure. Certain steps can be deleted, added, combined, or sequenced as required. In one preferred embodiment, the Product App may be configured to download, install and/or enable an operational profile into the embedded SIM of cellular communications 210.

Referring back to FIG. 2, in one preferred embodiment, instead of, or in addition to, a cellular or mobile broadband modem, cellular communications 210 may preferably be configured with any combination and number of integrated circuits, components, controllers, transceivers, radios, aerials, memory, microprocessors, SiPs, PoPs, or SoCs to support single or bi-directional low power, wide area (LPWA) wireless communications. Where desirable, cellular communications 210 may be configured for compatibility with one or more technologies, protocols, standards or specifications from Amber Wireless, Coronis, Greenwaves, Haystack Technologies, Link Labs, Actility, Telensa, Huawei, LoRa, M2M Spectrum Networks, NWave, On-Ramp Wireless, Senaptic, Sigfox, Neul, Weightless, WAVIoT, Orange POPS or other suitable solutions including additional proprietary solutions based on 802.15.4 technologies.

It can be appreciated that LPWA wireless communications involves a LPWA network operator (LPWANO) or infrastructure provider in a similar way that a MNO provides the cellular or mobile broadband network infrastructure. In one preferred embodiment, a wireless communications link provided by adaptable communications 202 can preferably be utilized by the Product App to provision a power management device 200 onto a LPWA wireless network of a particular LPWANO. Where desirable, the Product App may preferably transfer to an LPWANO a unique product identifier, such as an identification code or codes that can implicitly or explicitly be utilized to identify and commission a power management device on a LPWA wireless network. It can be appreciated that a LPWANO could utilize a unique product identifier to associate a power management device with a service contract or subscription in allowing a power management device to access or utilize a LPWA network. Where desirable, the Product App may use the same, or similar, mechanisms for establishing a service contract or subscription with a LPWANO as already outlined in relation to a MNO. The provisioning of a power management device 200 may utilize a service platform where required. In one preferred embodiment, LPWA wireless communications is preferably configured to operate in a narrow band, or ultra narrow band, sub-1 GHz frequency. Where cellular communications 210 is configured with LPWA wireless communications operating in a frequency band or bands below 1 GHz, aerial 210a is preferably configured to support the desired frequency band or bands.

In one preferred embodiment, cellular communications 210 is preferably configured with a fully integrated single-chip radio transceiver designed to operate across a number of sub-1 GHz ISM (Industrial, Scientific and Medical), SRD (Short Range Device) and licensed frequency bands. In one preferred embodiment the Product App through adaptable communications 202 preferably allows for the configuration of cellular communications 210 according to the frequency and communications requirements of a chosen protocol, standard or specification of an LPWA network and may enable a protocol, standard or specification already loaded into the memory of a power management device 200, or download to the memory of a power management device 200 a desired protocol, standard, specification or configuration profile. Where desirable, the Product App through adaptable communications 202 may preferably allow for the configuration of cellular communications 210 according to any security requirements including the transfer and/or enablement of any trust structures, keys, authentication, certificates, encryption or other security requirements. In that way, a power management device 200 may be manufactured with configurable LPWA wireless communications and provisioned in field according to the frequency and communications requirements of an LPWANO.

Where desirable, adaptable communications 202 can preferably be put into a low power sleep state or dormant state after a power management device 200 has been provisioned onto a cellular or mobile broadband data network or an LPWA wireless network in order to conserve power. In some preferred embodiments, a power management device 200 may be configured to preferably utilize a wireless communications link through adaptable communications 202 or local network communications 206 as a primary communications channel and to utilize a communications link through cellular communications 210 as a fallback when communications cannot be established through a primary channel. In some preferred embodiments, a power management device may be configured to preferably utilize a wireless communications link through cellular communications 210 as a primary communications channel and to utilize a communications link through adaptable communications 202 or local network communications 206 as a fallback.

Referring back to FIG. 2, power measurement module 212 is preferably configured to report a broad range of data to system microcontroller 208. This may include any combination of parameters, metrics, conditions, specifications and time associated with electricity being supplied to an electrical circuit and electricity being used on an electrical circuit or by an electrical device, such as, but not limited to: instantaneous voltage, current and power; active, reactive and apparent power; average real power; RMS voltage and current; power factor; line frequency; overcurrent; voltage sag; voltage swell; phase angle; temperature and/or any other data or metric that may be measured, recorded or stored by power measurement module 212. These metrics may be recorded to memory and utilized by system microcontroller 208 to determine electricity used over a defined time period; operational characteristics including any deviation from a specification, limit or base measurement; temperature; service requirements; analysis and/or any other metric or logical sequencing that could be compiled from the measured, recorded or stored data from power measurement module 212.

Any data measured, recorded, stored, calculated, analysed, generated, manipulated, compressed, downloaded, received, entered or complied in a power management device 200 can preferably be exchanged with a service platform or the Product App through any available wireless communications, such as wireless communication supported by adaptable communications 202 or cellular communications 210. Once the appropriate data has been transferred to the Product App or a service platform, the Product App or service platform can preferably perform any desirable analysis, calculations, visualizations or conversions and where necessary display the results on the smartphone's touch sensitive screen or service platform user interface for the user to view.

The inclusion of power measurement allows more advanced functionality other than metering to be offered by a power management device 200. In one preferred embodiment, system microcontroller 208 may continuously measure various electrical parameters through power measurement 212 allowing system microcontroller 208 to detect possible error conditions or a variation from a threshold or limit set by a manufacturer or user in order to cause a power control circuit, such as relay 216 or relay 218, to reduce or cut power to an electrical device or appliance in protecting both the power management device 200 and the electrical device or appliance. In another preferred embodiment, system microcontroller 208 through power measurement 212 may take a measurement under operational load to establish a normal operating threshold for a device or appliance. System microcontroller 208 could be configured by the Product App or service platform to periodically or continuously monitor power measurement 212 and cause a power control circuit to terminate power on detection of a deviation from a specified threshold or measured operating threshold. System microcontroller 208 could periodically or continuously monitor power measurement 212 and also report to the Product App or a service platform any variation or deviation from a specified threshold or measured operating threshold. By way of example, this could be used to measure the operating load of a group of lights connected to a power management device 200 and allow a user through the Product App or a service platform to determine if any lights had blown based on the change in power being consumed rather than having to inspect each luminaire. By way of another example, an initial operational load measurement could be taken for an appliance or device at the time of installation or could be set based on a manufacturer's specification, any variance from the original operational load creating a power signature that could be comparatively analysed and used in determining if the variation signalled a potential deteriorating condition requiring maintenance or service before becoming a potential failure. In that way power measurement 212 could be configured to measure and report within a broader predictive analysis framework that may utilize a service platform to compare or analyse variations in a power signature over time. It can be appreciated that this would be highly advantageous for monitoring various electric motors, appliances and devices.

In one preferred embodiment, power management device 200 may be configured to report to the Product App or a service platform a termination in power to a device or appliance in response to an error condition or crossing of an operational threshold. In one preferred embodiment, a power management device 200 may be configured to resupply power after a period of time to a device or appliance where power was terminated in response to an error condition or crossing of an operational threshold. Where the error condition or crossing of an operational threshold persists, the power management device 200 may preferably terminate power to the device or appliance and lock the ability to resupply power until a command to do so is received from the Product App or a service platform.

In one preferred embodiment, power management device 200 is preferably configured with power control circuits that may include any suitable power switching technologies such as a single semiconductor switch/relay, or electro-mechanical switch/relay configured to vary the supply of power to an electrical device or appliance in a simple on/off fashion. In another preferred embodiment, power control circuits may include any number and mix of switches and relays, such as relay 216 and relay 218, configured to vary the supply of power to different devices separately, or grouped, in a simple on/off fashion, or configured to vary power to an appliance or device utilizing a method to reduce radiated interference that will be outlined in more detail below. In another preferred embodiment, power control circuits may include any number and mix of semiconductor switches, mixers, relays, or electro-mechanical switches and relays configured to vary the supply of power to more than one appliance, device or individual component, including individual components in a lighting element, or to various lighting elements. In another preferred embodiment, power control circuits may include a dimming control or controls. A dimming control is used to vary the amount of power transferred to a lighting element, or a component of a lighting element, where it has the appropriate characteristics to allow the light output to be varied anywhere from fully on to fully off or some intermediate range of light output, as directed by system microcontroller 208. Using dimming in power control circuits under the control of system microcontroller 208, the amount of electrical power transferred to a lighting element can be regulated. Because the electrical load presented to the dimming control can be resistive, inductive or capacitive depending on the light type and arrangement, the dimming control can provide leading edge, trailing edge, pulse width modulation or other suitable methods of variable power control. In one preferred embodiment, the Product App preferably allows the dimming control in a power management device 200 to be configured according to the electrical requirements of a particular lighting element. In one preferred embodiment, a power management device 200 may be configured as a programmable logic controller with any number of switching and power control elements. Where power management device 200 is configured with a power control circuit or circuits, system microcontroller may preferably record the number of switching operations a power control circuit or circuits has executed. A power management device 200 may be configured with a power control circuit or circuits, configured for single phase or three phase switching according to the requirements of a desired load.

In one preferred embodiment, power control circuits may be configured as a single or three phase variable-frequency drive, adjustable-frequency drive, variable-speed drive, AC drive, micro drive or inverter drive used to control external electrical motor speed and torque by varying motor input frequency and voltage, the topologies and methods of which are familiar to those of ordinary skill in the art and for simplicity are not described herein. Where power control circuits are configured as a variable-frequency drive, smartphone 10 and/or service platform 500 may preferably be used to program or control the operation of an attached load, including one or more of starting, stopping, reversing or varying the operating speed. Where desirable, a power management device 200 configured with a variable-frequency drive may be programmed according to the specific capabilities and application of an attached load, which may include, for example, configuration of single-quadrant load, two-quadrant load or four-quadrant load drive applications. In one preferred embodiment, operation of a variable-frequency drive may be managed by a dedicated microcontroller rather than system microcontroller 208. It can be appreciated that power measurement 212 can be utilized in performing or monitoring any variable-frequency drive operations.

Power management device 200 can be configured for domestic, consumer or industrial/commercial applications. Consumer applications typically involve the switching of low power loads that have low duty cycles. Industrial and commercial applications typically involve the switching of high power loads which invariably have high inrush currents with leading or lagging power factors. They can have high duty cycles and need to deliver a high Mean Timer to Failure (MTTF).

In one preferred embodiment, power management device 200 is preferably configured with power control circuits using a semiconductor switch (SCR, Triac, etc.) for low power loads. A semiconductor switch is an electronic device and does not generate Electromagnetic Interference (EMI) or Radio Frequency Interference (RFI) at a sufficient level to affect other systems within power management device 200. Semiconductor switches are unsuitable for high power switching because of high power losses, thermal runaway and open circuit power leakage from snubber circuits.

In one preferred embodiment, power management device 200 is preferably configured with power control circuits using an electro-mechanical relay or contactor relay for high power loads. Relays have metal to metal contacts which are opened or closed to control power to a load. Electrical power is delivered to a load when the relay contacts are closed forming an electrical circuit. When AC electrical power is delivered to a load, the voltage and current are most commonly sinusoidal having a positive peak value, a zero value and a negative peak value over time. For 50 Hz mains power, the period of one complete cycle is 20 ms, and for 60 Hz systems it is 16.67 ms. If a relay contact is closed when the voltage wave form is at its peak value, maximum current will flow to the load. If a relay contact is closed when the voltage waveform is at its zero value, zero current will flow to the load. An electro-mechanical relay or contactor relay being a mechanical device, can generate significant EMI/RFI when its contacts open, close or bounce, especially when high power is being controlled. EMI/RFI can be generated when a relay closes while the voltage waveform is at a high value and the contacts bounce due to their closing inertia causing sparking. EMI/RFI can also be generated if a relay contact is opened when the current waveform is at a high value, causing arcing as the contacts separate to break the current flow. If a relay contact is opened when the current waveform is at a zero value, no current is flowing, so arching will not occur and no EMI/RIF will be generated.

Relays are specified to switch power at a maximum level for a rated life, which may be tens of thousands of operations. Relays are not specified for the amount of EMI/RFI they generate when switching. When relays are switched asynchronously to the mains power voltage waveform, the amount of EMI/RFI generated by any one switching action is unknown. The power management device's microcontroller 208 and wireless communications systems are susceptible to interference from EMI/RFI, but need to coexist in close proximity to relays capable of generating EMI/RFI. Given that power management device 200 can be configured to control large power loads, it is desirable to prevent randomly generated EMI/RFI from switching circuits.

A relay contact is typically closed when a control circuit, such as relay drivers 214, energizes a relay's coil, creating a magnetic field that causes a movable contact to close onto a fixed contact which completes an electrical circuit allowing current to flow to the load. The relay contact is kept closed while the coil remains energized. A relay contact opens when the control circuit stops energizing the relay's coil, causing the magnetic field to collapse and allowing the spring tension of the moveable contact to open the moveable contact from the fixed contact, thereby stopping current flowing to the load. As the relay is a mechanical device, there is a delay from the time the control circuit energizes the relay coil to when the contacts close (operate time) and a delay from the time the control circuit de-energizes the relay coil to when the contacts open (release time). Each relay type has manufacturer specified operate and release times, however they are nominated as maximum values and the actual performance can be randomly significantly shorter. For most power relays that are designed to operate in equipment and applications of 110V/20 A and 250V/16 A, the operate and release times can be similar to a half cycle period of the AC mains power signal. It is therefore difficult to use the relay manufacturer's maximum specification to accurately control the timing in closing and opening a relay relative to the AC mains power signal.

In addition to the manufacturer specified operate and release times, the relay contacts have a bounce time where the kinetic energy stored in the moving contact is dissipated against the fixed contact. This action causes the contacts to open and close for a short period of time making an intermittent circuit to the load until they become fully closed and stable. Contact bounce time is normally not specified by a manufacturer and is part of the operate time specification.

In order to minimise EMI/RFI generation from a relay, it is necessary to operate the relay synchronously with the voltage and current being applied to a load. If the contacts bounce when the peak current is flowing, maximum EMI/RFI will be generated by the resultant arcing. Minimum EMI/RFI on contact closure is achieved when the voltage zero crossing time coincides with the time the relay contacts are halfway through the contact bounce time period. At this time there is only a very small voltage applied to the load during the bounce time, so only a very small current will flow and contact arcing will be small to effectively zero depending on the load current requirements. For example, a 1 A peak operating current has much less current flowing during the bounce time than a 10 A peak operating current.

Minimum EMI/RFI on a contact opening is achieved when the current zero crossing time in the negative direction is just prior to the relay contact starting to open to ensure there is minimal to zero current flowing at the time the contacts are opening.

Accordingly, it can be seen that if the relay operate, release and bounce times are of a similar magnitude to the AC mains power half cycle period, accurate relay operating characteristics are required if the relay is to be opened or closed in a way that minimizes EMI/RFI. It should be noted that the measurement of the current zero crossing time, while more complex than for the voltage, is desired because the load may be resistive, inductive or capacitive which will determine the time relationship between the voltage and the current waveforms. Relying on just the voltage zero crossing time can cause significant timing errors if the load is not resistive or the power factor is not known, which in a general purpose case is unlikely. It should be noted that the voltage waveform is the reference timing and the current waveform is related to the voltage waveform by the power factor as would be understood by those skilled in the art.

In one preferred embodiment, system microcontroller 208 is preferably configured to control a relay switch operation based on actual operate, release and bounce times synchronised with the voltage and current zero crossing time as appropriate to reduce EMI/RFI emissions.

To ensure accurate control of the relay relative to a load's voltage and current waveforms, it is desirable to know: the relay actual operate and release times; the mains voltage zero crossing time; the load current zero crossing time; and the relay contact bounce time or closure. One method in determining a relay's parameters are to measure the operating characteristics of a statistical relevant sample of a particular relay and then batch test relays during manufacture of a power management device to ensure the determined operating characteristics are being met. Given that this method has an inbuilt operating characteristic variation, each relay incorporated into a power management device 200 will have a different EMI/RFI profile that, while better than if no screening or testing, could still impact on the performance of EMI/RFI sensitive components and systems within power management device 200.

In one preferred embodiment, a manufacturing test procedure preferably tests the characteristics of a particular relay, or relays, incorporated into a power management device 200 in situ. Power management device 200 is preferably connected to a manufacturing testing platform, the test platform preferably causing system microcontroller 208 to open and close any relays so that each relay's operate, release and bounce times can be automatically measured. At the conclusion of the testing procedure, the manufacturing test platform preferably transfers into the non-volatile memory of power management device 200 the actual operate and release times for each particular relay, allowing system microprocessor 208 to switch a particular relay or relays in accordance with actual relay values as detailed below.

Power management device 200 preferably includes circuits designed to provide low level signals to system microcontroller 208, allowing the voltage and current zero crossing times to be determined, or provide an interrupt to system microcontroller 208 at the zero crossing times, or other appropriate methods of determining the zero crossing times. In one preferred embodiment, power measurement 212 preferably measures and reports to system microcontroller 208 the power factor and the voltage and current zero crossing times.

When a relay is to be opened or closed, system microcontroller 208 preferably determines when the mains voltage is at its zero crossing time. In order to minimize EMI/RFI, system microcontroller 208 preferably mathematically calculates when the next zero crossing time will occur and the time at which a relay needs to be energized or de-energized knowing the relay's actual operate, release and bounce times stored in memory so that: when closing, the voltage zero crossing time coincides halfway through the relay contact's bounce period; when opening, the positive to negative current zero crossing time is prior to the start of the relay contact's release time.

It should be noted that the accurate timing of a relay is not applicable to a common change-over or double-throw form of relay where two contacts are used to provide power independently to separate loads. By way of example, a change-over relay may be configured so that both the normally open (NO) and normally closed (NC) contacts are used to provide power independently to separate loads, such as for example, load 1 and load 2. For a change over relay in the OFF state, the NC contacts are closed and power is provided to load 1, with the NO contacts open and no power going to load 2. When the relay is activated, the single movable contact changes from connecting to the NC fixed contact to connecting to the NO fixed contact. In the ON state the NC contacts are open and no power is provided to load 1, with the NO contacts closed and power going to load 2. It can be appreciated that there is a fixed time relationship between the NC or NO contact opening and the correlative NC or NO contact closing, so that it is not possible to guarantee both the voltage zero crossing time coinciding halfway through the relay contact's bounce period for the closing and the positive to negative current zero crossing time coinciding with the start of the relay contact's release time for the opening. In cases where a change-over or double-throw relay is desirable or required, it can preferably be simulated with two NO contact relays, or a NO contact relay and an NC contact relay, such as relay 216 and relay 218. In this exemplary configuration, each relay can preferably be controlled by system microcontroller 208 independently of the other and the time methodology requirements for minimizing EMI/RFI generation can be met.

If a user manually controls a relay, for example by closing a switch, the operation is being executed asynchronously to the AC mains voltage and current applied to a load. In one preferred embodiment, before a relay switching event is initiated by a power management device 200, system microcontroller 208 preferably monitors the voltage (on event) or current (off event) to synchronise the relay switching with the mains power zero crossing time.

Figure 6:
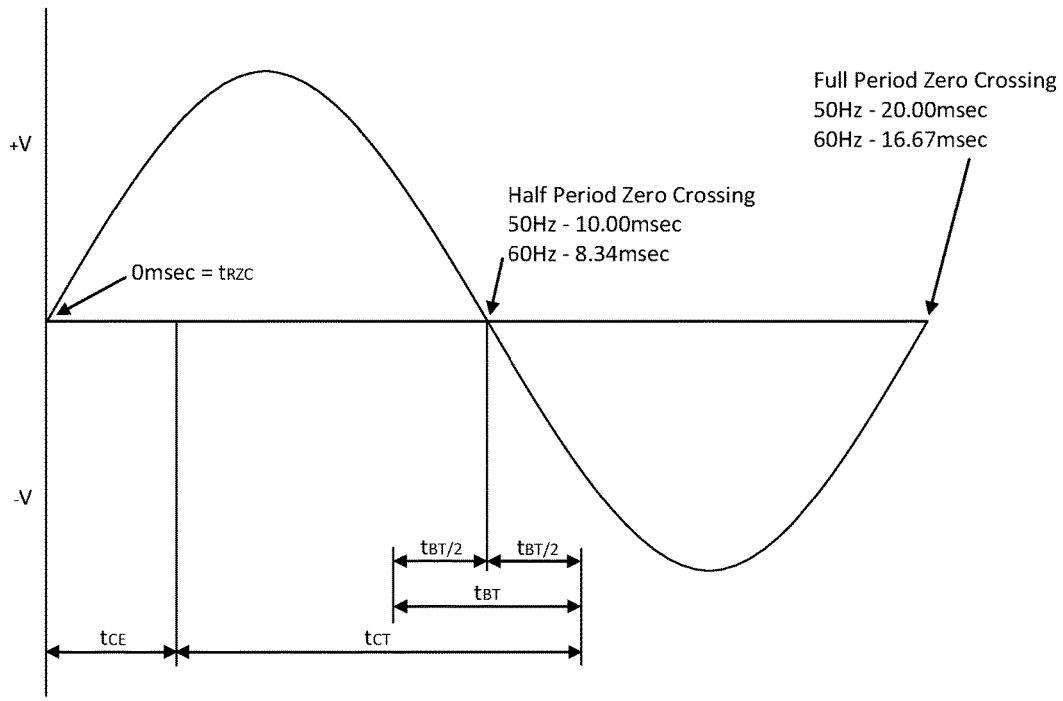
FIG. 6 is a diagram of an exemplary zero voltage switching methodology in accordance with one preferred embodiment of the present disclosure.
Figure 7:
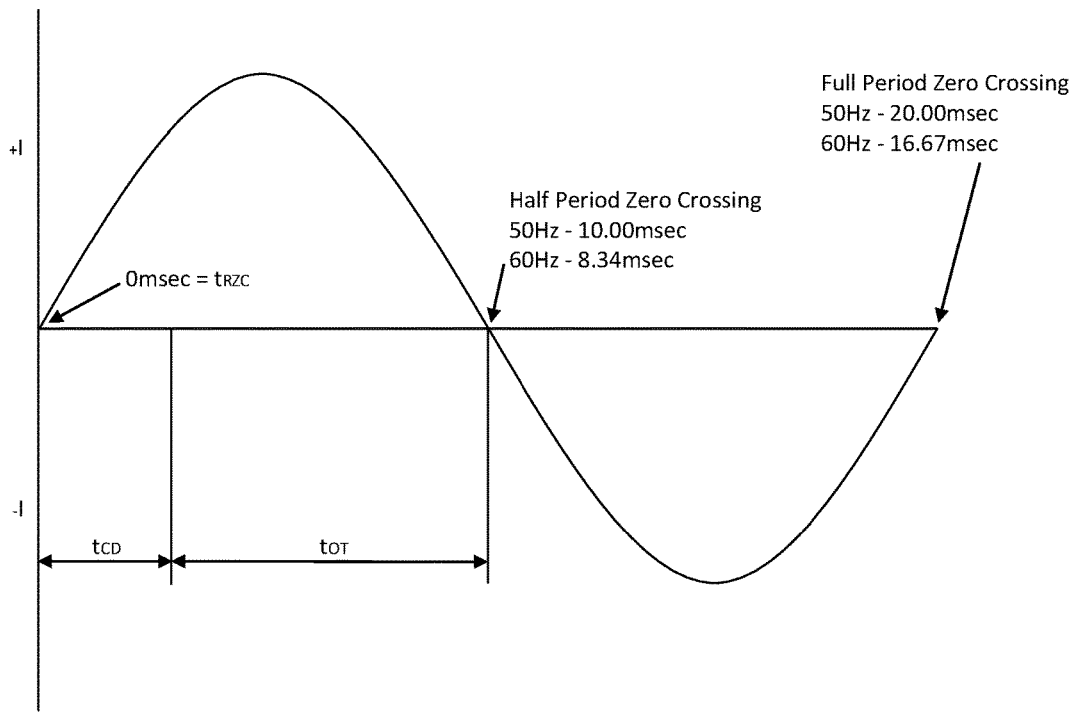
FIG. 7 is a diagram of an exemplary zero current switching methodology in accordance with one preferred embodiment of the present disclosure.

Referring now to FIG. 6 and FIG. 7, an exemplary zero voltage switching and zero current switching methodology is outlined below in accordance with one preferred embodiment of the present disclosure. For the following calculations, Reference Zero Crossing ($t_{RZC}$) is the timing reference point when a controlling signal, whether voltage or current, is at its zero value. For a 50 Hz mains power system the zero point occurs every 10 ms. For a 60 Hz mains power system the zero point occurs every 8.335 ms. Open Time ($t_{OT}$) is the time it takes for a relay contact to open enough, from the time the relay coil drive is removed to disconnect the power fully from the load. Close Time ($t_{CT}$) is the time it takes for a relay contact to fully close, from the time the relay coil drive is applied to when power is fully connected to the load. Bounce Time ($t_{BT}$) is the time it takes for the kinetic energy stored in a moving contact to be dissipated when it hits and then bounces against a fixed contact before a stable connection is made. $t_{BT}$ is included in $t_{CT}$. Coil Energize ($t_{CE}$) is the time from $t_{RZC}$ when the relay coil drive is applied to energize the relay, and provides for a "lead time" by which the relay is activated in order to minimise EMI/RFI. Coil De-energize ($t_{CD}$) is the time from $t_{RZC}$ when the relay coil drive is removed to de-energize the relay, and similar to the Coil Energize time, provides for a "lead time" by which the relay is de-activated in order to minimise EMI/RFI.

The following example of relay timing is for a 50 Hz system where the full cycle period is 20 ms and the time between zero crossing is 10 ms. The same algorithms apply for a 60 Hz system except the full cycle period is 16.67 ms and the time between zero crossing points is 8.335 ms. To close an open relay contact and minimise EMI/RFI, microcontroller 208 preferably energizes the relay coil at $t_cE$ from $t_{RZC}$ of the voltage waveform where: if $(t_{CT}-t_{BT}/2)$ ms<10 ms then $t_{CE}=10-(t_{CT}-t_{BT}/2)$, otherwise $t_{CE}=20-(t_{CT}-t_{BT}/2)$ ms. To open a closed relay contact and minimise EMI/RFI, microcontroller 208 preferably de-energizes the relay coil at $t_{CD}$ from $t_{RZC}$ of the current waveform where: if $t_{OT}$<10 ms then $t_{CD}$=10−$t_{OT}$, otherwise $t_{CD}$=20−$t_{OT}$. It can be appreciated by one skilled in the art that the preceding algorithms can be adapted for Normally Open and Normally Closed relays as needed.

For systems where large currents are being switched by a relay or contactor, $t_{CD}$ can be reduced by an incremental amount so the contacts start to open just prior to the current zero crossing time to ensure rapid extinguishment of any arcing as the zero current point is crossed.

In one preferred embodiment, power management device 200 may not contain any embedded power control circuits and operate as a power measurement device through power measurement 212.

In one preferred embodiment, a power management device may be configured as a single phase or three phase meter, such as an electricity smart meter used in domestic and commercial applications. It can be appreciated that any of the features, capabilities and functions outlined for power management device 200 can be applied to a power management device configured as a smart meter. By way of example, where a power management device is configured as a smart meter, adaptable communications 202 may preferably be configured to initially operate in a peer-to-peer mode, thereby allowing a smart device, such as a tablet or smartphone, to communicate directly with the smart meter. Utilizing a peer-to-peer connection, users may, through the Product App, choose to configure adaptable communications 202 in a network mode and connect to an available WLAN as a network client. In that way adaptable communications 202 may be configured to operate as a home area network for a power management device configured as a smart meter instead of, or in addition to, local network communications 206. It can be appreciated that where a power management device is configured as a smart meter with local network communications 206 utilizing Zigbee, power management device 200 may preferably be configured as a ZigBee Smart Energy coordinator and Trust Centre rather than router or end device. Without limiting any of the communication pathways, topologies, capabilities or features outlined for power management device 200, it can be further appreciated that communications through an advanced metering infrastructure could be implemented by way of cellular communications 210. Where desirable, adaptable communications 202 may be enabled or disabled by commands received through an advanced metering infrastructure. In one preferred embodiment, adaptable communications 202 may include security measures implemented through an advanced metering infrastructure that restrict connections to authorized devices. In one preferred embodiment, where a power management device is configured as a smart meter, the ability to control any power control circuits may preferably be disabled through adaptable communications 202.

In one preferred embodiment, power management device 200 may not contain any embedded power control circuits and interface with external power control circuits allowing for a custom number of circuits to meet the particular requirements of the application at hand.

Where power management device 200 controls external power control circuits, it may do so through a physical connection (for example only, a wired connection) or may alternately use a wireless communications link, which can include any of the wireless communications links and capabilities outlined in relation to power management device 200. Alternately, the ability to control external power control circuits may require the addition of a supporting radio to power management device 200 that may be a transmitter, or a transceiver, depending on the requirements of the external power control circuits. The supporting radio may be configured by system microcontroller 208 to operate at a number of different carrier frequencies. Data could be modulated onto those carrier frequencies such that the encoded data could be received, decoded and acted upon by a compatible radio receiver or transceiver in a remote power control circuit configured to operate, or integrated into, devices such as, for example only, door mechanisms, gate mechanisms, motorized blind and awning mechanisms, motorized screen mechanisms, light switches, lighting controllers, lighting fixtures, lamps, luminaries, power control mechanisms, power outlets, fans, climate control equipment such as thermostats and air conditioning units, vending machines, sprinkler and watering systems, pumps, pool filtration systems, gas metering and control equipment, electricity meters, peripheral computer equipment, consumer electronics, whitegoods, and alarm systems.

The supporting radio may be capable of FSK, GFSK, MSK, OOK or other modulation methods and be able to operate over a wide frequency range including the license free Industrial Scientific and Medical (ISM) frequencies, or may support specific standards such as ZigBee, Z-Wave, Thread or equivalent standards. While these specifications are applicable to most wireless sensor networks, home and building automation, alarm and security systems and industrial monitoring and control, there may be applications where a system compatible transceiver with specific frequency and modulation specifications is required. In these situations, a specific supporting radio could be provided within the embodiment described herein.

It will be appreciated that the power control circuits described above can be extended in many ways without departing from the scope of the present disclosure.

In one preferred embodiment, a power management device 200 may be configured to include one or more illumination means or visual elements that represent a status or operative element of power management device 200. A visual element could be by way of simple light emitting diodes, LCD, colour LCD, an integrated display, a touch screen or any combination thereof.

Because power management device 200 can preferably be configured with a number of radios in very close proximity operating in the same radio spectrum, such as 2.4 GHz, there is a requirement to prevent radio transmissions interfering with each other. In order to prevent the communications from one radio interfering with others, system microcontroller 208 is preferably configured to sequence radio transmissions to minimize the potential for disruption. The sequencing of radio transmissions may be in addition to other coexistence methods such as dynamic frequency hopping and error correction.

It will be appreciated by those of ordinary skill in the art that the system described above can be varied in many ways without departing from the scope of the present disclosure. By way of example only, elements of adaptable communications 202, system microcontroller 208, perpetual clock calendar 204, local network communications 206 and cellular communications 210 may be aggregated, or separated, into single or multiple components, SoCs, PoPs or SiPs. For example only, ZigBee may be added to adaptable communications 202 instead of local network communications 206. Where adaptable communications 202 is configured to support HAN or PAN communications, an additional aerial or aerials may be added where shared antenna support is not feasible. It will be appreciated that while Bluetooth has been discussed in relation to communications between smartphone 10 and power management device 200, it is not so limited, and is capable of supporting short range wireless PANs with other Bluetooth enabled devices. In one preferred embodiment, Bluetooth can be used as a communication medium between power management devices and other Bluetooth enabled appliances and devices, including the use of mesh enabled protocol layers such as CSRMesh, where desirable.

Figure 3:
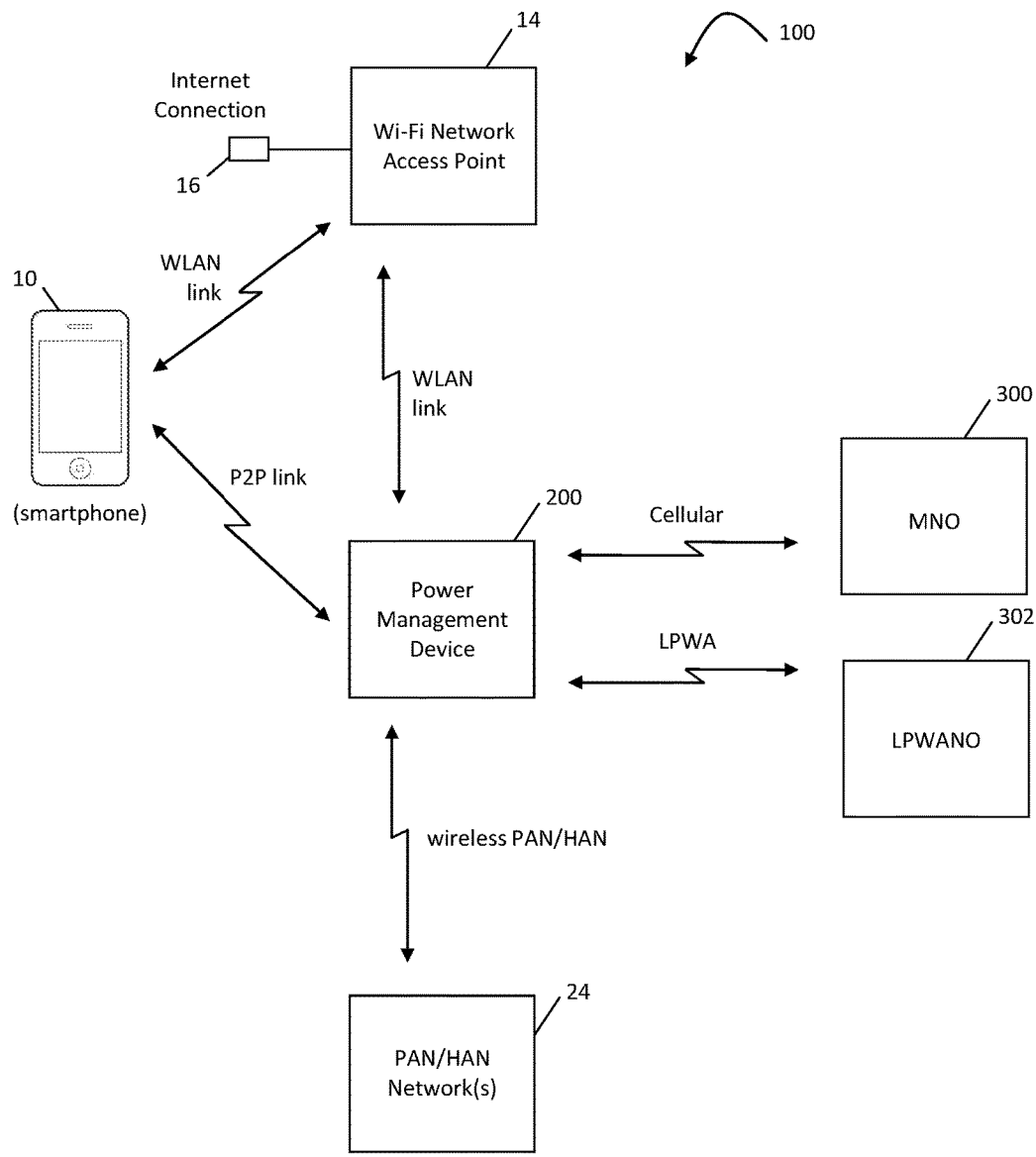
FIG. 3 is a system pictorial representation of the smartphone of FIG. 1 and its interaction with the power management device of FIG. 2.

Referring now to FIG. 3, a pictorial representation of system 100 is shown with an exemplary arrangement of smartphone 10, power management device 200, MNO 300, LPWANO 302, appliances or devices PAN or HAN network 24 and preferred communications systems connecting each of the elements that will be described in detail below. System microcontroller 208 is preferably configured to route, transfer or transpose data across any communications systems incorporated into power management device 200.

Wi-Fi WLAN has an access point 14. Access point 14 has an Internet connection 16. Wi-Fi WLAN communications preferably pass through access point 14. Where power management device 200 is configured as a network Wi-Fi device, it preferably operates as a client of access point 14. For smartphone 10 to communicate with power management device 200 running as a network Wi-Fi client, smartphone 10 is also preferably connected to access point 14 as a client. Messages from smartphone 10 could then pass through access point 14 to power management device 200. If smartphone 10 were not in wireless range of access point 14, it may still be able to communicate with access point 14 via internet connection 16 if so configured. The communications between a smartphone and an access point through an Internet connection will be described in further detail below.

In one preferred embodiment, power management device 200 may preferably be configured to communicate with other devices and appliances connected to the same WLAN through access point 14, which may include other power management devices where desirable.

In addition to, or instead of, operating as a network Wi-Fi device, power management device 200 may be configured as a Wi-Fi Direct group participant or to simulate a Wi-Fi access point. In that instance, smartphone 10 can wirelessly connect directly to power management device 200 peer-to-peer without requiring any other device. Accordingly, it can be seen that: (1) access point 14 is not required for peer-to-peer communications; (2) the communications link is formed on an "as needed" basis; and (3) that smartphone 10 needs to be within radio range of power management device 200 to establish a direct peer-to-peer communications link. Where desirable, a peer-to-peer connection between smartphone 10 and power management device 200 could be established using Bluetooth.

While not show, in one preferred embodiment power management device 200 may be configured as an actual Wi-Fi access point providing Wi-Fi compliant devices access to a wired network by preferably aggregating and performing the role of access point 14.

It can be appreciated that adaptable communications 202 and its multi-mode, peer-to-peer and network communications capabilities allow a power management device 200 to be configured in a number of different ways for communications with a smartphone with, or without, the use of a Wi-Fi network. A power management device operating as a network Wi-Fi device may be remotely accessed and controlled by a smartphone or service platform where the access point has an internet connection, however the power management device then becomes exposed to the outside world and may be vulnerable to external threats such as hacking. Alternatively, a peer-to-peer connection by virtue of its limited wireless range and architecture offers a higher level of security. The balance between operational modes is usually subjective and dependant on the application at hand. In some instances infrastructure limitations such as the availability of an access point 14 may constrain operational modes. In some markets the penetration of Wi-Fi networks is relatively low so that it is highly advantageous for power management device 200 to provide a peer-to-peer means of communicating with a smartphone and preferably connect to a WLAN as a client if available and desirable to do so.

Where power management device 200 is configured with cellular communications 210 and cellular communications 210 is configured with cellular or mobile broadband wireless technologies, a power management device 200 can preferably communicate through a cellular or mobile broadband data network of a MNO, such as MNO 300. Where power management device 200 is configured with cellular communications 210 and cellular communications 210 is configured to communicate via LPWA wireless technologies, a power management device 200 can preferably communicate through a LPWA network of a LPWANO, such as LPWANO 302. The infrastructure of MNO 300 or LPWANO 302 preferably provides a communications pathway between power management device 200 and a service platform. The Product App on smartphone 10 is preferably able to communicate with the service platform, and through the service platform to a power management device 200 connected to a MNO data network or LPWANO data network. It can be appreciated that the service platform may be integrated into, or provided by, an MNO or LPWANO in facilitating communication between the Product App and a power management device 200.

Power management device 200 may be configured to measure and provide a received signal strength indicator, or received channel power indicator, of access point 14 which power management device 200 may preferably report to the Product App for display on smartphone screen 12. A received signal strength indicator, or received channel power indicator, is a measurement of the power present in a received radio signal and allows a user to locate wireless products such as power management device 200 close enough to access point 14 in order to ensure that a sufficiently strong wireless signal exists between the two devices to provide the best environment for a stable and reliable communications link. The Product App may display on smartphone screen 12 a received signal strength indicator, or equivalent, of a local network communications wireless signal measured by power management device 200. The Product App may display on smartphone screen 12 a received signal strength indicator, or equivalent, of a cellular or mobile broadband data network wireless signal or a LPWA network wireless signal measured by power management device 200. The Product App may preferably display on smartphone screen 12 a received signal strength indicator, or received channel power indicator, for a power management device 200 measured by smartphone 10.

If desired, power management device 200 may be configured with a visual indicator capable of displaying a received signal strength indication for any wired or wireless signal that power management device 200 may be capable of measuring.

In one preferred embodiment, the Product App may preferably display a signal strength indicator, or received channel power indicator, of a wireless communications signal as measured by smartphone 10 in order to assist with the initial placement and installation of power management device 200 before it has been powered on and any communications links have been established. In that way, a user through the Product App could preferably stand in close proximity to the location where they wished to install power management device 200 and through the Product App utilizing a smartphone's wireless communications, take a signal strength or received channel power measurement of access point 14 and displaying that in the Product App, thereby allowing the Product App or user to determine if a sufficiently strong wireless signal exists to optimally support power management device operating as a client of access point 14 at that proximate location. In one preferred embodiment, the Product App may provide a visual indicator that identifies the suitability of the measured signal strength of access point 14 in supporting power management device 200 as a client. By way of example, this could include a pointer or indicator against coloured sections within the Product App, the coloured sections preferably comprising red, orange and green with red denoting a poor measured signal strength of access point 14 and therefore an unsuitable proximate location to install the power management device, orange denoting an acceptable but not optimum location, and green denoting a strong measured signal strength of access point 14 and therefore a suitable proximate location for installation of the power management device. It can be appreciated that other visual indicators may be suitable and within scope of the present disclosure where they preferably identify the suitability of a proximate location for a power management device 200 based on the measured signal strength of an access point 14 by smartphone 10.

Where desirable, the Product App may be configured to preferably display a signal strength indicator, or received channel power indicator, for a cellular or mobile broadband data network as measured by smartphone 10 in order to assist with the initial placement and installation of power management device 200 before it has been powered on and any cellular communications links have been established.

Referring again to FIG. 3, power management device 200 may be configured to communicate with appliances and devices in a PAN or HAN network 24, or networks, wirelessly using a suitable PAN or HAN communication technology such as ZigBee. In some preferred embodiments it may be preferable to configure power management device 200 with dual-network communication capabilities the methodology of which has been outlined earlier in relation to FIG. 2.

Because smartphones do not typically include native ZigBee, Thread or Z-Wave communication capabilities, they cannot communicate directly with appliances or devices configured with ZigBee, Thread or Z-Wave. Power management device 200 therefore preferably performs any computational tasks necessary to ensure data from the Product App is transposed into a format compatible with appliances and devices in a PAN or HAN network 24, and data from appliances and devices in a PAN or HAN network 24 is transposed into a format compatible with the Product App, thereby facilitating two way communications as shown in FIG. 3.

In order for the Product App running on smartphone 10 and appliances and devices in a PAN or HAN network 24 to communicate, any data preferably passes between power management device 200 and smartphone 10 wirelessly peer-to-peer, via access point 14, via MNO 300 or LPWANO 302, depending on the chosen configuration of power management device 200.

The Product App is preferably configured to expose or cause the display of the controls and capabilities of an appliance or device on a network to which power management device is a participant or coordinator, allowing the Product App running on smartphone 10 to exchange data and commands with a desired appliance or device through a power management device 200 acting as an intermediary and facilitator. Some appliances or devices may utilize their own proprietary command sets or language even where using an open communication protocol, standard or specification, in which case the Product App is preferably configured to utilize the proprietary command sets or language of the target appliances or devices in order to effectively exchange commands and data. In one preferred embodiment, the Product App may be configured with a range of different command sets or languages allowing it to effectively communicate with a number of otherwise disparate appliances or devices.

As outlined in further detail in relation to FIG. 4, the Product App running on smartphone 10 can preferably communicate with access point 14 via internet connection 16 utilizing a service platform, thereby enabling communications between the Product App and a power management device 200 connected to access point 14 where smartphone 10 cannot directly communicate with access point 14, such as when smartphone 10 is out of wireless range of access point 14.

In one preferred embodiment, power management device 200 is preferably configured to route requests from the Product App for data from an appliance or device in a PAN or HAN network 24 to the target appliance or device in a PAN or HAN network 24, and route responses from the appliance or device in a PAN or HAN network 24 back to the Product App. In that way, the Product App is preferably configured to exchange data with appliances and devices in a PAN or HAN network 24 and power management device 200 is preferably configured to operate as a router or intermediary facilitating the movement of data between the Product App and appliances and devices in a PAN or HAN network 24. By way of example, the Product App may request, via a ZigBee Smart Energy cluster, data stored in a smart meter corresponding to the power consumed over a chosen month, that request being routed from the Product App by power management device 200 to the smart meter which preferably compiles the data for the chosen month and routes a message through power management device 200 back to the Product App.

In one preferred embodiment, an appliance or device in a PAN or HAN network 24 may preferably be configured to continuously, or periodically at a pre-determined sample rate, author, broadcast or multicast repetitive data onto a local communications network, with power management device 200 configured to route the data to the Product App allowing the Product App to dynamically update a field or fields in accordance with variations in the continuous or periodic repetitive data authored, broadcast or multicast by an appliance or device. By way of example, a smart meter may be configured to communicate via a ZigBee Smart Energy cluster to continuously broadcast desirable state data to a PAN or HAN at certain intervals, such as current power usage at a pre-determined sample rate, which power management device 200 could preferably route to the Product App where the data could be dynamically displayed and vary in accordance with the power measurements being authored by the smart meter.

In one preferred embodiment, an appliance or device in a PAN or HAN network 24 may preferably be configured to author, broadcast or multicast intermittent data onto a local communications network in response to a change in status, power management device 200 being configured to route the data to the Product App allowing the Product App to dynamically update a field or fields in accordance the change in status reported the appliance or device. By way of example, a smart meter may be configured to communicate via a ZigBee Smart Energy cluster to author, broadcast or multicast a change in state data to a PAN or HAN, such as a change in the tariff, which power management device 200 could preferably route to the Product App where the tariff field or fields could be updated according to the data authored by the smart meter.

In one preferred embodiment, power management device 200 is preferably configured to route requests from a service platform for data from an appliance or device in a PAN or HAN network 24 to the appliance or device in a PAN or HAN network 24, and route messages from the target appliance or device in a PAN or HAN network 24 back to the service platform.

In one preferred embodiment, power management device 200 is preferably configured to generate requests for data recorded or stored in an appliance or device in a PAN or HAN network 24 and route messages from the appliance or device in a PAN or HAN network 24 to the Product App or a service platform.

In one preferred embodiment, where an appliance or device in a PAN or HAN network 24 is configured to continuously, or periodically at a pre-determined sample rate, author, broadcast or multicast repetitive data onto a local communications network, power management device 200 is preferably configured to route the data to a service platform.

In one preferred embodiment, where an appliance or device in a PAN or HAN network 24 is preferably configured to author, broadcast or multicast intermittent data onto a local communications network in response to a change in status, power management device 200 is preferably configured to route the data to a service platform.

In one preferred embodiment, power management device 200 preferably operates as a router or intermediary between the Product App, service platform, and appliances or devices in a PAN or HAN network 24 and does operate as a database for energy measurements from those appliances or devices other than to facilitate routing.

The Product App is preferably configured to use a smartphone's cellular or network Wi-Fi capabilities to exchange data with a service platform. Exchange of data with a service platform could include, by way of example only, data for the purpose of programming, controlling, provisioning, securing or interrogating a power management device 200 or calculating or displaying trend analysis, historical analysis, comparative analysis, predictive analysis, granular metrics, costing, tariffs, budgets, billing and any other uses of the data measured by a power management device 200.

Where desirable, the Product App may preferably be configured to display the instantaneous power measured by power measurement 212. In a preferred embodiment, the Product App is configured to use data from power measurement 212 and, where necessary, data from a service platform or a device or appliance in a HAN or PAN network 24, such as a tariff or tariffs, to determine and display energy usage represented in a cost per unit of time, such as dollars per hour. In that way, a user through the Product App may determine the total instantaneous cost per unit of time of the electricity consumed by all electrical apparatus connected to a power management device 200 relative to a tariff or tariffs.

Where desirable, the Product App may preferably be configured to display the cost per unit of time to run a chosen electrical apparatus attached to power management device 200 and the rate of energy conversion or transfer with respect to time based on an instantaneous power measurement in combination with a tariff or tariffs.

The Product App is preferably configured to allow a user to save the calculated cost per unit of time associated with an electrical apparatus attached to a power management device 200 into the Product App or a service platform and to compile a database so that the user may quickly and easily identify and compare the electrical consumption profiles of a range of products and/or systems, or of a particular electrical apparatus over time.

Where an appliance or device in a PAN or HAN network 24 is capable of measuring and reporting energy consumption metrics, the Product App may preferably be configured to receive those energy consumption metrics through power management device 200 and save a calculated cost per unit of time; cumulative energy consumption data over a period of time; or any other reported energy metric associated with an individual appliance or device, into the Product App to compile a database so that the user may quickly and easily identify and compare the electrical consumption profiles of a range of products and/or systems, or of a particular electrical apparatus over time.

In one preferred embodiment, the Product App may be configured to save an energy consumption metric associated with an appliance or device in a PAN or HAN network 24 to a service platform or download an energy consumption metric associated with a particular appliance or device in a PAN or HAN network 24 from a service platform.

Where an appliance or device in a PAN or HAN network 24 is capable of measuring and reporting energy consumption metrics, power management device 200 may preferably be configured to receive energy consumption metrics from an appliance or device in a PAN or HAN network 24 and route the data to a service platform.

Where the electricity in a building, structure or installation is billed based on time of use tariffs, the Product App may preferably display the cost per unit of time for a present tariff as well as a cost per unit of time for any other tariff. In that way, the Product App may provide a dynamic assessment of electricity consumption measured by power measurement 212 across a number of tariffs allowing a user to determine the impact of consuming electricity at a particular rate across those tariffs.

The Product App may preferably be configured to allow a user to enter a number of parameters such as the day or days, time of day and/or for how long the power control circuit of a power management device 200 is active, allowing the Product App to use any combination of cost per unit of time measurements and calculations, tariffs and operational times to display an estimated cost for operating an appliance or device functionally coupled to a power management device 200 over the user definable period of time. The Product App may preferably be configured to analyse the cost of use over a user definable period of time and suggest a means to minimise cost by reducing and/or shifting the use of an appliance or device to more efficient days, or periods in a day, depending on analysis of any variable tariffs. The Product App may preferably be configured to offer an alert to avoid operating a particular appliance or device in response to an anticipated spike in peak demand or during a peak tariff period.

In one preferred embodiment, the calculations undertaken in the Product App in displaying the cost per unit of time for the present tariff as well as a cost per unit of time for any other tariff, including suggested periods to minimise cost, may be performed or assisted by a service platform with the results being reported to the Product App for display. The Product App may preferably be configured to offer an alert generated by a service platform to avoid operating a particular appliance or device in response to an anticipated spike in peak demand or during a peak tariff period.

It can be appreciated that cost per unit of time could equally be substituted or supplemented with a number of different metrics without departing from the scope of the present disclosure. By way of example only, other suitable metrics may include instantaneous power represented in kilowatt hours (kWh), an amount of a greenhouse gas generated per hour, and/or an equivalent carbon emissions value based on the electricity being used. If a carbon emissions metric is utilised, parameters used to calculate a real-time carbon emissions preferably include power usage and power source (e.g., coal burning source, hydro, wind and/or solar). Suitable base carbon emissions values may be obtained for each mode of electrical production in order to facilitate calculations.

Referring to FIG. 3, where an appliance or device in a PAN or HAN network 24 has controllable functions, the Product App through power management device 200 using local network communications 206 may preferably allow a user to control, configure or program functions of that appliance or device in a PAN or HAN network 24. By way of example, where an appliance or device in a PAN or HAN network 24 is a connected light capable of executing a number of functions, the Product App may preferably be configured to allow a user to control the functions of the connected light such as turn on/off, dim, change colour, schedule, etc. In one preferred embodiment, a user could preferably schedule tasks to be performed by appliances or devices in a PAN or HAN network 24, the schedule being executed by the appliance or device without needing a persistent communications link between power management device 200 and a smartphone 10. In one preferred embodiment, system microcontroller 208 may be configured through the Product App to preferably issue commands to an appliance or device in a PAN or HAN network 24.

Where a power management device 200 is capable of varying power based on a trigger event being received through a wireless communications interface, a user through the Product App may preferably configure an action to be taken by a power management device 200 in response to a trigger event. A trigger event may include, but is not limited to, variation of a tariff or the receipt of a demand response command, threshold, flag, notification or data packet.

Where an appliance or device in a PAN or HAN network 24 has power control capabilities, or is configured as a power control device allowing for the regulation of electricity to one or more appliances, apparatus, devices, products, and/or circuits within a building, structure or installation, the Product App through power management device 200 may preferably allow a user to control, configure or program functions of that appliance or device in a PAN or HAN network 24, including causing it to vary the supply of electricity based at least in part on instructions communicated from the Product App. In that way, and by example only, a user could schedule the supply or consumption of electricity by one or more appliances or devices in a PAN or HAN network 24, the schedule being executed by the appliance or device without needing a persistent communications link between the smartphone and power management device 200. By way of another example, where an appliance or device in a PAN or HAN network 24 is capable of responding to a demand response condition or change in tariff, the Product App through power management device 200 may preferably allow a user to configure or program the action that an appliance or device in a PAN or HAN network 24 is to execute in response to receiving a demand response event or a change in tariff. A demand response event can be generated by power management device 200, or received and routed through power management device 200, using any desirable communication channel, which by way of example may include a demand response event sent from a service platform where power management device 200 is connected to access point 14 and access point 14 has internet connection 16, or power management device 200 is connected to an MNO 300 network or LPWANO 302 network. By way of another example, a demand response event or change in tariff may be generated by smart meter, received by power management device 200 on one HAN or PAN and routed to a different HAN or PAN associated with other appliances and devices where power management device 200 is so configured.

In one preferred embodiment, system microcontroller 208 is preferably configured by the Product App to issue commands to an appliance or device in a PAN or HAN network 24 based on a pre-configured schedule. System microcontroller 208 may preferably be configured by the Product App to issue commands to an appliance or device in a PAN or HAN network 24 based on receiving a command from a service platform which may include commands from a rules engine, such as the execution of an "If This Then That" (IFTTT) or equivalent logic recipe. In one preferred embodiment, system microcontroller 208 may preferably be configured by the Product App to issue commands to appliances or devices in a PAN or HAN network 24 based on a rules engine or logic recipe executed locally by system microcontroller 208. In that way, and by example only, a user could schedule one or more appliances or devices in a PAN or HAN network 24 to turn on or off at a pre-determined time or the occurrence of a pre-determined event, the commands for varying the operational state of the appliance or device being generated by system microcontroller 208 or system microcontroller 208 executing commands from a service platform without needing a persistent communications link with smartphone 10. Power management device 200 could selectively command individual or sub-groups of appliances or devices if desired. Such commands may be based on individual parameters associated with each appliance or device or sub-group, such as device type and/or power requirement.

In one preferred embodiment, system microcontroller 208 is preferably configured to vary power through a power control circuit or execute a function based on receiving a command from a service platform, which may include commands from a service platform generated by a rules engine. By way of example, system microcontroller 208 may report energy metrics measured by power measurement 212 to a service platform, the service platform being configured to send an instruction to system microcontroller 208 to terminate power through a power control circuit if a measured energy metric exceeds a parameter or threshold preconfigured in the service platform.

In one preferred embodiment, system microcontroller 208 may preferably be configured to vary power through a power control circuit or execute a function based on a rules engine running locally in system microcontroller 208.

Power management device 200 may include a display if desired. In one preferred embodiment, microcontroller 208 is preferably able to manipulate the visual elements of the display based on metrics reported by power measurement 212 in order to visually allow a user to interpret an electricity or consumption metric at any point in time. Where required, power management device 200 may download any necessary data from a service platform in displaying an element or making a calculation to display. By way of example only, the display may dynamically show the cumulative cost in a local currency such as dollars of the total bill for the current reporting period based on the electricity consumption being reported by power measurement 212 and the appropriate tariffs. By way of another example, coloured indicators may represent how consumption is tracking against a desired budget in a visual form, ranging, for example, from green to within budget to red for over budget. The display may preferably include a visual representation of the instantaneous rate of energy being consumed compared to a base or normal operational load. In one preferred embodiment, the display may be configured to mirror or mimic elements of the user interface displayed on the smartphone screen. In one preferred embodiment, a power management device 200 may be configured without an integral display.

FIG. 4 is a pictorial representation of a system 400 having a plurality of communication pathways between and amongst smartphone 10, power management device 200, MNO 300, LPWANO 302, a service platform 500, a user interface 502 a PAN or HAN network 24 or networks. It will be appreciated that other communications pathways or arrangements may be possible and within the scope of the present disclosure.

Devices and elements within system 400 preferably utilize encapsulated communications with the necessary abstraction layers to communicate with each other through a chosen communication pathway. Where desirable, abstraction layers may preferably follow a general form of application layer, transport layer, internet layer and link layer. Without limiting the use of any suitable protocols, protocols that may preferably be utilized may include any number or mix (including extensions, amendments or proprietary implementations) of: DHCP, DNS, FTP, OMG DDS, TFTP, HTTP, LDAP, NTP, ONC/RPC, RTSO, SNTP, CMOT, XMPP, SSH, TLS/SSL, MQTT, CoAP, TSP, TCAP, AllJoyn, ATP, DCCP, FCP, IL, MPTCP, RDP, RUDP, SCTP, SPX, SST, TCP, UDP, uTP, IPv4, IPv6, ICMP, ICMPv6, ECN, IGMP, IPsec, and any protocols in relation to a TCP/IP or OSI link layer. Communications within system 400 are preferably secured through encryption, which may include multiple simultaneous instances for a single communication such as encrypting a payload and the transport separately. Encryption within system 400 may utilize any mix and number of symmetric or asymmetric methods. A shared public ledger or block chain may be utilized where desirable.

Several communications pathways outlined in FIG. 4 are similar to those described above in relation to FIG. 3. In particular, wireless peer-to-peer connection 402 between smartphone 10 and power management device 200, WLAN connection 404 between power management device 200 and access point 14, WLAN connection 406 between smartphone 10 and access point 14, local network communications 408 between power management device 200 and appliances or devices in a PAN or HAN network 24 or networks, cellular or mobile broadband network connection 412 between a power management device 200 and MNO 300, and LPWA network connection 418 between a power management device 200 and LPWANO 302 are preferably configured as described above for system 100.

Continuing with reference to FIG. 4, service platform 500 is preferably an applications service platform, server, and/or public, private or hybrid cloud programmed with, or containing a software as a service platform that communicates with smartphone 10, and preferably the Product App, via a cellular or mobile broadband connection such as connection 410, or internet connection such internet 414, depending on the communications capabilities of smartphone 10 and pathways available at the smartphone's location at any particular point in time.

Service platform 500 preferably includes the necessary computer(s), computing device(s), server(s) and/or technologies capable of one or more of processing, analysing, compiling, transposing, storing, exchanging, transferring, generating, receiving, sending, manipulating, compressing, cataloguing, securing, authenticating, updating, encrypting, and/or displaying data as necessary for any purpose that may include capturing, curating, storing, searching, sharing, transferring, predicting, locating, notifying and visualizing data or controlling a controllable element in system 400. Service platform 500 can communicate with at least smartphone 10 and one or more of power management device 200, MNO 300, LPWANO 302, user interface 502, an appliance or device in a PAN or HAN network 24, an appliance or device connected to access point 14, an appliance or device connected to power management device 200 and/or another third party, using an available communication pathway, or pathways, and communication methods.

MNO 300 is preferably configured to communicate with service platform 500 through communication pathway 416. Communication pathway 416 can be formed between two nodes of a communications network and utilise one or more of the internet, wireless, satellite, telephone, fibre or a direct line, the actual communication standard and methodology of which is not material as long as data can be exchanged between service platform 500 and MNO 300 through a medium and in a format that the recipient can interpret and use. Examples of communications nodes include, but are not limited to computers, servers, wireless radios, routers, and communications gateways.

LPWANO 302 is preferably configured to communicate with service platform 500 through communication pathway 422. Communication pathway 422 can be formed using any of the structures or methods described above for pathway 416.

Referring again to FIG. 4, in one preferred embodiment, the Product App preferably includes an agent, client, API, or other software interface to facilitate communications between service platform 500 and the Product App using an available communication pathway, or pathways, and communication methods. By way of example, the Product App may communicate with service platform 500 utilizing cellular connection 410 of smartphone 10. By way of another example, the Product App may communicate with service platform 500 where smartphone 10 is connected to access point 14 through WLAN connection 406, and access point 14 has internet connection 16 allowing service platform 500 to communicate with access point 14 via internet 414, thereby allowing service platform 500 and smartphone 10 to form an indirect communications link.

In one preferred embodiment, power management device 200 preferably includes an agent, client, API, or other software interface to facilitate communications between service platform 500 and power management device 200 using an available communication pathway, or pathways, and communication methods. By way of example, where power management device 200 is connected to access point 14, and access point 14 has internet connection 16, power management device 200 may communicate with service platform 500 via internet 414. By way of another example, where power management device 200 is connected to MNO 300 via a cellular or mobile broadband network connection 412, it can preferably communicate with service platform 500 through communication pathway 416. By way of another example, where power management device 200 is connected to LPWANO 302 via a LPWA network connection 418, it can preferably communicate with service platform 500 through communication pathway 422. While not show in FIG. 4, in one preferred embodiment service platform 500 and a power management device 200 may be configured to communicate through an appliance or device in a PAN or HAN network 24 where that appliance or device can form a communications pathway with service platform 500. Such a communications pathway may require additional service platforms acting as intermediaries. By way of example, a smart meter in a PAN or HAN network 24 could be configured to communicate with a power management device 200 and service platform 500 and thereby act as an intermediary for communications between a power management device 200 and service platform 500.

In one preferred embodiment, service platform 500 may preferably be configured as an intermediary for smartphone 10, through cellular connection 410, to remotely communicate with power management device 200 and control any of the capabilities of, or exchange data with, power management device 200 through internet 414 where power management device 200 is configured as a client of access point 14 through WLAN connection 404. Smartphone 10 could preferably utilize service platform 500 and communications pathway 416/412 through MNO 300, or communications pathway 422/418 through LPWANO 302 to control any of the capabilities of, or exchange data with, power management device 200 where power management device 200 is so configured.

It can be appreciated that where service platform 500 and power management device 200 can establish a communications link, service platform 500 may preferably utilize the communication link with power management device 200 to communicate with appliances and devices in a PAN or HAN network 24 also in communication with power management device 200 through local network communications 408. In that way, service platform 500 could preferably control, program, interrogate or exchange data with appliances and devices in communication with power management device 200.

In one preferred embodiment, service platform 500 may preferably act as an intermediary allowing smartphone 10 to remotely control, program, interrogate or exchange data with appliances or devices in a PAN or HAN network 24 connected to power management device 200. By way of example, where power management device 200 is connected to access point 14, and access point 14 has internet connection 16, power management device 200 may communicate with service platform 500 via internet 414. The Product App running on smartphone 10 may utilize cellular connection 410 to establish a communications link with service platform 500. Service platform 500 can then preferably act as an intermediary allowing the Product App to preferably control, program or interrogate appliances or devices in a PAN or HAN network 24 in communication with power management device 200 through local network communications 408.

Service platform 500 is preferably capable of communicating and exchanging data with any smartphone running the Product App.

Data that service platform 500 handles may include, but is not limited to, commands, configurations, firmware, updates, energy measurements, sensor measurements, forecasting, notifications, analysis of any metric, tariffs, historical information, rules, schedules, sequencing, billing information, budget information, usage information, user data, installer data, user measurements, security elements, location information including global positioning data, demand response configurations, installation codes, identification codes, number of switching operations, alerts, images, media, alarms, text, state reports, condition reports, support information, customer service information, fault reports, contracts, agreements, request for service, offers, email, short message service (SMS), and push notifications.

It will be appreciated that the data capabilities of service platform 500 allow it to act as an intermediary for a number of services. By way of example, service platform 500 could preferably generate a message for smartphone 10 warning consumers that a peak demand period is expected at a particular time, and delivers that message using cellular connection 410 and/or internet 414, through WLAN connection 406 between smartphone 10 and access point 14. Consumers then preferably use smartphone 10 through power management device 200 to interrogate a smart meter in a HAN or PAN network 24 of the anticipated energy consumption at the expected peak demand period in order to manage their own power consumption in response to the data service platform 500.

Any message, notification or alert from service platform 500 to smartphone 10 is preferably delivered as a push notification to the Product App on smartphone 10. It will be appreciated that the use of additional intermediary services from Google™, Microsoft™' Apple™ or another third party may be required in order for service platform 500 to effect a push notification to the Product App. Alternatively, a message from service platform 500 could be delivered by way of SMS to smartphone 10. It will be appreciated that the use of additional intermediary services from a telecommunications company may be required in order for service platform 500 to send an SMS to smartphone 10. If desired, the user may be presented with an option to select a message delivery means as their preferred delivery means. For example, the user may elect to receive notifications via e-mail or SMS.

Service platform 500 is preferably configured to operate as an intermediary for third parties to communicate with the Product App running on smartphone 10, which could include any one or more of the exchange of data for forecasting, location, notifications, analysis of any metrics, comparative analysis, tariffs, historical information, billing information, budget information, installer details, usage information, user data, measurements, demand response configurations, alerts, technical support information, customer service information, request for service, offers, contracts, agreements, fault reports, email and SMS.

Preferably, the Product App is configured to upload any data stored by it on an associated smartphone; any data extracted from, or reported by, an associated smartphone; any data extracted from, or reported by, an associated power management device; and/or any data extracted from, or reported by, an associated appliance or device on a PAN or HAN network 24, to service platform 500. Service platform 500 may choose to share any information uploaded to it with other third parties, devices or appliances.

Service platform 500 preferably calculates and delivers to smartphone 10 an analysis of the data from one or more of the Product App running on smartphone 10, from a power management device 200 and/or appliances or devices on a PAN or HAN network 24, and may perform a comparison with data compiled from one or more of the Product App, power management device 200 and/or appliances or devices on a PAN or HAN network 24 associated with other smartphones providing data to service platform 500.

Referring to FIG. 4, database 504 is preferably configured to store energy metrics recorded by power measurement 212 from a plurality of sources for one or more power management devices and/or systems. In a preferred embodiment, platform 500 utilises the energy metrics stored in database 504 to conduct comparative and predictive analysis of appliances or devices connected to a power management device individually. In one preferred embodiment, platform 500 utilises the energy metrics stored in database 504 to conduct comparative and predictive analysis of appliances or devices connected to a power management device across related systems or applications which may be used to determine averages, means, trends and norms. It will be appreciated that the data may be stored across a public, private or hybrid cloud if desired rather than a single database server.

Conventional energy rating systems often rely on testing performed at a manufacturer or independent government agency. Due to variances in manufacturing methods and operational conditions, the energy efficiencies of electrical devices and systems often change, making the static testing of products less accurate. One or more preferred embodiments of the systems and methods disclosed herein advantageously permit dynamic energy measurement and tracking of electrical apparatuses, devices and systems. For example, as the energy metrics for a given electrical apparatus or system is received by service platform 500 from one or more networks or smartphones (via the Product App), service platform 500 is preferably configured to dynamically update (calculate) and maintain information such as energy efficiency ratings, power consumption metrics, and costs for each electrical apparatus and system databased. This information presents a more accurate representation of energy metrics than that offered by conventional systems. The energy information or data may be used by governments and/or utilities to promote energy-conscience purchasing of products by offering incentives such as rebates, or by manufacturers in better understanding the performance of their electrical devices over time, thereby improving servicing accuracy or potentially highlighting design improvements. The energy information or data may be used by an owner or manager of an appliance or device to verify that it is operating within specification. Other variations are possible and within the scope of the present disclosure.

Service platform 500 may preferably analyse the data from the Product App running on smartphone 10 and/or a power management device 200, or collection of power management devices, and deliver to the Product App a comparison showing the differential of alternate tariff(s) of an energy retailer on the current electricity usage and tariff. Service platform 500, by way of the Product App, may preferably be authorized to make an offer on behalf of an energy retailer for the recipient to transfer their electricity billing to the energy retailer making the offer on agreed terms. A recipient of an offer could accept that offer through the Product App, the acceptance of which would be relayed to the appropriate energy retailer in the electricity market by service platform 500.

Service platform 500 may preferably analyse the data from a definable group of power management devices, and deliver to the Product App a comparison showing the differentials for a chosen energy metric across each of the power management devices over a definable period of time. The service platform 500 may provide an average, normal or manufacturer's specified operational baseline as a guide for making a comparative analysis.

Data processing performed by service platform 500 may preferably be grouped within defined geographical locations. In one preferred embodiment, service platform 500 is preferably configured to manage or limit communication pathways based on the geographic location of one or more of smartphone 10, power management device 200, MNO 300 or LPWANO 302.

Referring back to FIG. 4, system 400 is preferably configured to permit automatic and/or manual selective variance of power to individual electrical devices and/or systems by one or more of the smartphone user, power management device 200 or service platform 500. For example, a power management device may be controlled according to a command or schedule implemented through the Product App resident on a user's smartphone. There may be times when it is necessary or preferable to vary or interrupt the schedule due to a triggering event. Where there is a trigger event, either service platform 500 or an electricity industry participant through a smart meter in a PAN or HAN network 24 may issue a notification directly a power management device 200. In response thereto, power management device 200 may vary power, shut off power, or where there is a programmed schedule, delay or reset the schedule and/or issue appropriate commands to one or more appliances or devices in a PAN or HAN network 24.

By way of example, a power management device 200 may modulate power to a pool filtration system via a programmed schedule. The receipt of trigger in the form of a tariff change preferably causes power management device 200 to delay starting a filtration cycle until the tariff is changed to a lower tariff, or rescheduling a pool filtration cycle until a more favourable tariff condition exists. The delaying or rescheduling of a power management device 200 may be applicable to other devices and systems as desired, for example, air conditioning, heating, lighting, and/or water sprinkler systems.

Where a power management device 200 is capable of responding to a trigger event, it is preferably configured so that a user may elect to include their power management device 200 as a participant for triggering event notifications and responses.

In an example of where the triggering event is a demand response, service platform 500 or electricity industry participant may issue a demand response to network 400 to vary or shut off power in a manner similar to that described above for a tariff change. A demand response may be issued, for example, when power demand is approaching a critical level, or when the power grid is being strained in a geographical area as measured by power demand and power available. A demand response may be issued according to predictive modelling, for example, if the weather is predicted to be extreme, causing a spike in energy consumption. Upon receipt of a demand response, power management device 200 may operate in a manner similar to that described above for receipt of a notification of a tariff change. Power management device 200 may be configured so that in an emergency situation, a demand response may be issued to override any designations, for example, shutting off or reducing power to all power management devices.

Referring back to FIG. 4, in a preferred embodiment more than one power management device 200 may be installed in a building, structure or installation. Service platform 500 is preferably configured so that power management devices 200 may be grouped under an account or identity, allowing a user to manage a number of power management devices 200 which may be installed in a single building, structure or installation, or across many buildings, structures or installations that may span a number of different locations throughout the world.

In one preferred embodiment, a demand response command, threshold, flag, notification, or data packet or a variation in tariff may be used by power management device 200 to generate a notification or alert transmitted by power management device to the Product App utilizing any of the communications paths already outlined including communication pathways 402 or 404/406, and may involve service platform 500 including utilizing communication pathways 404/414/410, 412/416/410, or 418/422/410.

In one preferred embodiment, a user through the Product App can preferably set an aggregate power consumption limit or threshold in a power management device 200 which can be used as a trigger to generate a notification or alert to the Product App that the limit or threshold has been exceeded. An aggregate power consumption limit is the desired total amount of electricity that a user wishes to consume over a defined period of time. An alert may utilize any available communication path to the Product App as outlined in the communication topologies outlined in FIG. 4. Power management device 200 through power measurement 212, preferably measures the total amount of electricity consumed throughout the defined period and compares this with the user defined threshold stored in memory to determine if the threshold has been exceeded. In a preferred embodiment, power management device 200 can be configured to terminate power through a power control circuit where an aggregate power consumption limit or threshold is exceeded.

In one preferred embodiment, rather than setting a threshold in power management device 200, the Product App can be used to set an aggregate power consumption threshold in service platform 500. Through power measurement 212, power management device 200 sends to service platform 500, or service platform 500 request from power management device, continuous or periodic measurements of the total amount of electricity consumed throughout the defined period, service platform 500 comparing this with the user defined threshold to determine if the threshold has been exceeded. Where the threshold is exceeded, service platform 500 preferably generates a notification or alert. Where desirable, service platform 500 may preferably send an instruction to power management device 200 to terminate power through a power control circuit where a threshold has been exceeded.

In one preferred embodiment, it may be desirable for power management device 200 or service platform 500 to record or update a recurring rolling total consumption for a defined period of time on a cyclical basis. This may be, by way of example, each month or week.

In one preferred embodiment, the actual threshold or limit can be a percentage of the desired aggregate power consumption limit or threshold allowing a notification or alert to be generated before the desired threshold is exceeded. It can be appreciated that any desirable percentage can be used without departing from the scope of the present disclosure and that multiple notifications or alerts may be generated at different threshold percentages to provide more than one warning as consumption moves closer to the desired threshold.

In one preferred embodiment, a user through the Product App can preferably manually or automatically set a threshold in power management device 200, or service platform 500, which can be used by power management device 200 or service platform 500 as a trigger for system microcontroller 208 to execute a pre-configured command to a chosen device or appliance in a HAN or PAN network 24. By way of example this may be a command from system microcontroller 208 causing a device or appliance in a HAN or PAN network 24 to switch off or reduce power consumption in response to a threshold, or a percentage of a threshold, being met.

In one preferred embodiment, a user through the Product App can preferably manually or automatically set a threshold or limit in power management device 200 or service platform 500 for a metric or parameter measured by power measurement 212, which can be used by power management device 200 or service platform 500 as a trigger for system microcontroller 208 to execute a pre-configured command to vary power through power control circuits. By way of example, a user could specify a current trigger threshold in power management device 200 that could be used to terminate power where power measurement 212 reports that the desired threshold has been exceeded.

It can be appreciated that the threshold feature of the Product App, service platform 500 and power management device 200 can be modified in a number of ways without departing from the scope of the present disclosure. For example, the sample rate power management device 200 uses for power measurement 212 may be any desirable time interval and may range from a second to hours. By way of another example, the threshold monitoring period may be any desirable time interval, for example a day, week, month, year, etc., and start at any desirable time of day. Different units of time, currency, or value can be used in a calculation or displaying a result. Any underlying mathematical equations giving effect to a result displayed in a field or fields may increase in sophistication to deliver more accurate analysis or predictive results taking into consideration such things as tariff variations and the difference in energy consumed between the week, weekends, day and night. In one preferred embodiment, a user may set a budget threshold or limit in a power management device 200 or service platform 500 where the tariffs are known or power management device 200 can determine the tariffs through a communication channel.

User interface 502 preferably, allows a user to communicate with service platform 500 through a cloud dashboard, web interface, web browser portal, or software and may replicate and perform any desirable functionality of the Product App. In that way, user interface 502 could be used to access service platform 500 from a fixed location through a desktop computer or computer terminal rather than on a mobile device using the Product App.

User interface 502 is preferably configured to allow a user to manage, control and configure various elements, services and functions of service platform 500, such as the establishment of a user account and management of power management devices within that user account in service platform 500. User interface 502 preferably includes the necessary software, computer(s), computing device(s), server(s) and/or technologies capable of displaying, communicating and exchanging data with service platform 500 utilizing communication pathway 420. Communication pathway 420 can be formed using any of the structures or methods described above for pathway 416.

Where required, user interface 502 may preferably utilize an applications service platform, server, and/or public, private or hybrid cloud programmed with, or containing, software that communicates with service platform 500. In one preferred embodiment, user interface 502 may preferably be an integrated component, service or element within service platform 500 and may be hosted on service platform 500.

User interface 502 preferably allows a user to interface with service platform 500 and exchange data with a power management device or devices. By way of example, user interface 502 may be a software program running on a computer preferably configured to receive the same alerts or notifications from a power management device 200 or service platform 500 as the Product App. By way of another example, user interface 502 may be a cloud dashboard hosted on service platform 500 and accessed through a web browser on a computer that can be used to interrogate or control a power management device. The foregoing description is by way of example only, and may be varied considerably without departing from the scope of the present disclosure. For example, service platform 500 could be wholly or partly integrated inside an MNO, LPWANO or another third party.

In one preferred embodiment, a power management device can be completely integrated into an appliance or device or can be plugged into an appliance or device where power management device is in modular form. Examples include, but are not limited to: door mechanisms; garage door mechanism; gate mechanisms; lighting systems; lights; lighting fixtures; lamps; luminaries; motorized curtains, blinds, awnings and movie screens; vending machines; heat exchangers; pool filtration systems; pumps; irrigation devices that regulate the flow of water; sprinkler systems; electric motors; heating, ventilation and air-conditioning systems; thermostats; ceiling fans; security and alarm systems; sensors; hot water boilers; video and still cameras; gas metering and control equipment; electricity meters; home entertainment and musical systems; consumer electronics; robotics; surveillance systems; door locks; refrigerators; freezers; domestic appliances; industrial appliances; electric motors; and whitegoods.

Figure 5:
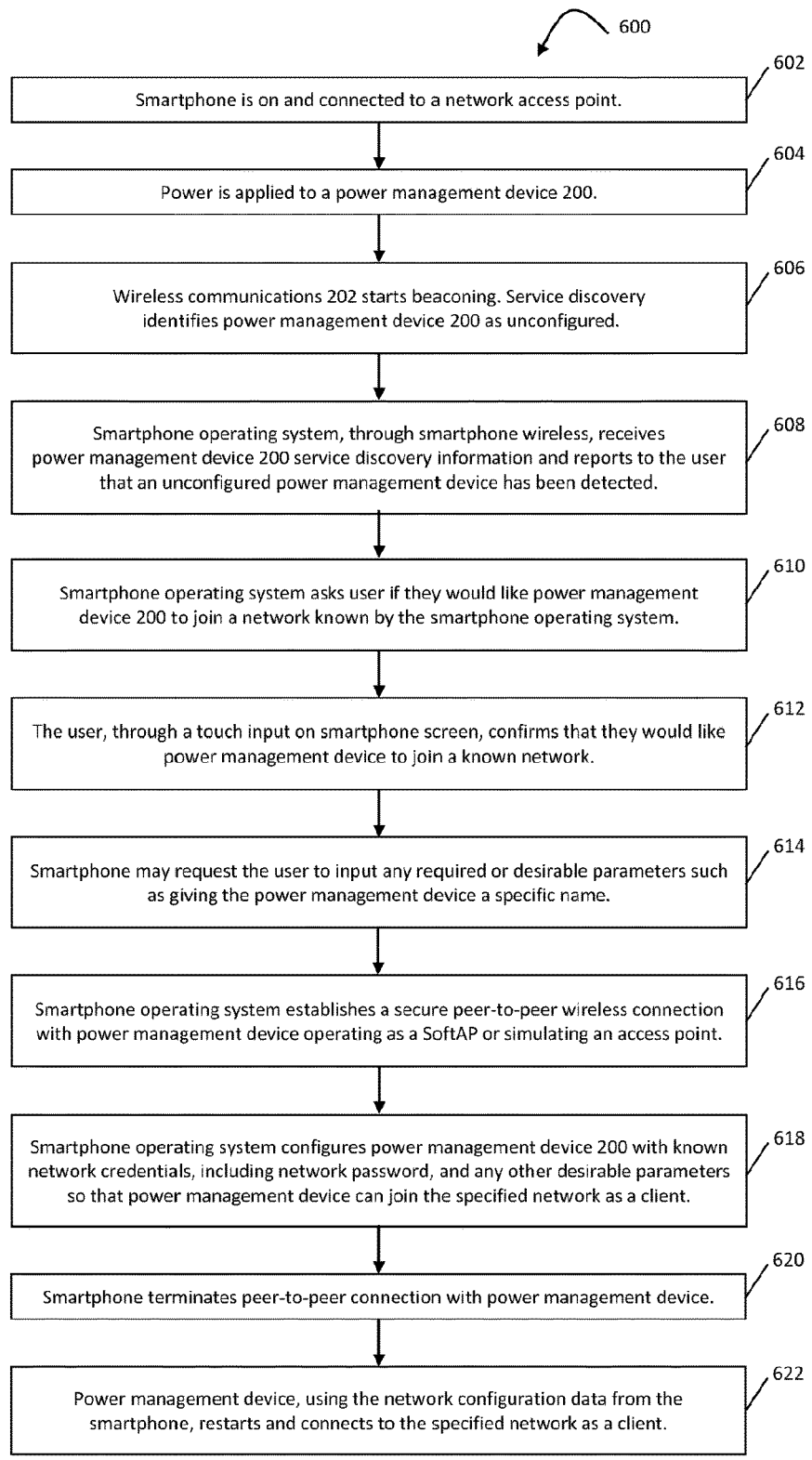
FIG. 5 is a flow diagram of an exemplary configuration procedure utilizing the smartphone of FIG. 1 to configure the power management device of FIG. 2 as a client device in Wi-Fi WLAN of FIG. 3 in accordance with one preferred embodiment of the present disclosure.

Turning now to FIG. 5, an exemplary configuration procedure 600 is shown for configuration of power management device 200 as a client of a Wi-Fi network by smartphone 10 in a preferred embodiment of the present disclosure. While configuration procedure 600 has been described in relation to a smartphone operating system, configuration procedure 600 is not so limited and may be performed by the Product App or an alternate app where either is able to control smartphone wireless communications as required.

At step 602, smartphone 10 is connected to a network access point, such as Wi-Fi network access point 14 in FIG. 3. At step 604 power is applied to power management device 200 for the first time, allowing power management device 200 to run all of its systems. At step 606, adaptable communications 202, configured to simulate a Wi-Fi network access point or operate as a SoftAP, begins to wirelessly beacon its network information. The wireless beacon preferably includes an identifier or service discovery component that reports power management device 200 as an unconfigured network Wi-Fi device to Wi-Fi devices configured to interpret the identifier. Where desirable, a specific service discovery beacon could be transmitted through an alternate network, such as Bluetooth, identifying power management device 200 as an unconfigured network Wi-Fi device. At step 608, the smartphone operating system through the smartphone's wireless transceiver, receives power management device 200 service discovery information determines that power management device 200 is unconfigured and reports to the user via the smartphone touch screen that it has detected an unconfigured power management device. At step 610, the smartphone operating system asks the user if they would like power management device 200 to join a known Wi-Fi network, preferably the network smartphone 10 is currently connected to. At step 612, the user through a touch input on the smartphone screen confirms they would like the unconfigured power management device to join a network known by the smartphone operating system.

At step 614, the smartphone operating system may require the user to enter a desirable or required parameter, such as a security code used in establishing a communications link between smartphone 10 and system microcontroller 208, or giving unconfigured power management device 200 a specific name to be used during configuration as a network client. It can be appreciated that step 614 may be excluded where providing the quickest and easiest mechanism for configuration of a power management device 200 by smartphone 10 as a client of a network known by smartphone 10 is desirable, or where elements of step 614 may be performed after power management device 200 is configured and connected to a network as a client, such as giving it a unique name.

At step 616, the smartphone operating system establishes a secure peer-to-peer Wi-Fi connection with power management device 200 preferably configured to simulate a network access point or operate as a SoftAP. The opening of a secure peer-to-peer Wi-Fi connection may include the utilization of authentication hardware, firmware or software, such as encryption software, integrated into power management device 200 and smartphone 10, so that power management device 200 may automatically establish a secure connection with smartphone 10 utilizing an authentication handshake without requiring the user to input any security credentials manually. It can be appreciated that where smartphone 10 is unable to support a simultaneous connection with a network access point and a device simulating a Wi-Fi network access point or operating as a SoftAP, such as power management device 200, smartphone 10 may disconnect from the Wi-Fi network access point in order to establish a secure peer-to-peer Wi-Fi connection with power management device 200.

At step 618, the smartphone operating system configures power management device 200 with the network credentials of a known network, including the network password, and any other desirable or necessary parameters so that power management device 200 can join the specified network as a network Wi-Fi client device. At step 620, the smartphone operating system terminates the peer-to-peer Wi-Fi connection with power management device 200. If the smartphone operating system disconnected from a network access point in order to establish a peer-to-peer Wi-Fi connection with power management device 200 at step 616, the smartphone operating system preferably re-establishes a connection with the network access point. At step 622, power management device 200, using the network configuration data from the smartphone, configures itself according to the network parameters supplied as a network Wi-Fi device and connects to the specified network access point as a client, after which power management device 200 and smartphone 10 are preferably able to discover each other and communicate with through the network access point.

In one preferred embodiment, it may be preferable for power management device 200 and smartphone 10 to utilize Wi-Fi Direct in establishing a peer-to-peer connection in configuration procedure 600. In that way, at step 606 wireless communications may preferably beacon as a Wi-Fi Direct device with an identifier or service discovery component where desirable. It can be appreciated that by utilizing Wi-Fi Direct, smartphone 10 may be able to maintain concurrent connections with a network access point and power management device 200 throughout configuration procedure 600.

It will be appreciated that certain steps outlined in configuration procedure 600 may be modified, deleted or added without departing from the scope of the present disclosure. For example, configuration procedure 600 may be adapted for execution by an API, the Product App or a third party app rather than a smartphone operating system. By way of another example, smartphone operating system may cause power management device 200 to start its configuration procedure after confirmation by the power management device that it has successfully received the network parameters from the smartphone, or system microcontroller 208 of power management device 200 may terminate the peer-to-peer connection with the smartphone and start its configuration procedure after successfully receiving network parameters from the smartphone without the smartphone operating system needing to initialize the process.

Referring back to FIG. 4, it may be highly advantageous for power management device 200 to report its geographic location to the Product App or service platform 500, or for system microcontroller 208 to utilize the geographic coordinates of power management device 200 in performing a calculation, such as algorithmically determining sunrise and sunset for the location where power management device 200 is installed. While not shown, in one preferred embodiment power management device 200 may be configured with a GPS or multi-constellation Global Navigation Satellite System (GNSS) or other positional technology such as, by way of example only, technology utilizing assisted GPS, synthetic GPS, cell ID, inertial sensors, beacons (including Wi-Fi, Bluetooth, and LPWA network beacons), network triangulation (including cellular and LPWA network triangulation), terrestrial transmitters, and geomagnetic field techniques that allow the location coordinates of power management device 200 to be determined and reported to system microcontroller 208.

It can be appreciated that the integration of global positioning technologies within power management device 200 add cost and complexity while consuming more power for a task that may be infrequently performed. In one preferred embodiment, the Product App is preferably configured to utilize the location services of smartphone 10 in determining the immediate global position of smartphone 10. The global position is preferably reported by the smartphone's location services in a format allowing a position on the Earth's surface to be determined from coordinates such as longitude and latitude, Universal Transverse Mercator coordinates, military grid reference system coordinates, or other suitable equivalents. Because location determination is typically a core service of modern smartphones, the present invention is not limited to using GPS and can equally accept location data from other technologies the smartphone may use.

After the Product App has acquired the location coordinates reported by smartphone 10, the user, preferably utilizing a wireless peer-to-peer communications link between smartphone 10 and power management device 200, can transfer the location coordinates for smartphone 10 from the Product App to power management device 200. Because a wireless peer-to-peer connection between smartphone 10 and power management device 200 requires relatively close proximity, the location coordinates for smartphone 10 serves as a close proximate for the location of power management device 200. Power management device 200 preferably records the location coordinates received from the Product App in memory and reports and utilizes those coordinates as its geographic location. System microcontroller 208 is preferably configured to report to service platform 500 and the Product App location coordinates for power management device 200 that service platform 500 or the Product App can use to geo-locate power management device 200. Service platform 500 or the Product App may visually display the location of power management device 200, or a number of power management devices, on a map or building floor plan utilizing the location coordinates specific to each power management device 200.

The visualization of a location on a map in the Product App or service platform 500 may utilize a web mapping service, mapping service application and/or mapping API such as Google Maps, Microsoft Bing Maps, Here Maps, Apple Maps or an equivalent, the integration of which would be understood by those of ordinary skill in the art.

In one preferred embodiment, the Product App is preferably configured to display the current location reported by the smartphone location services visually as a point on a map using an icon. Where the Product App is unable to acquire accurate, or any, location coordinates from the smartphone location services, a user can preferably determine their location by manually entering an address into the Product App, the Product App preferably being configured to use a web mapping service, mapping service application and/or mapping API to determine the location coordinates of that address which may be visually represented as a point on a map using an icon where desirable. It can be appreciated that the use of a web mapping service, mapping service application and/or mapping API allows the Product App to acquire the location coordinates of an address manually entered by a user where a personal controller is not equipped with geographic location determining technologies.

Smartphone location services sometimes have difficulty determining location, particularly if a higher level of accuracy is desirable. In one preferred embodiment, a user, utilizing the smartphone's touch screen, is preferably able to manually move a location icon in the Product App to a new location on a map. The Product App preferably utilizes the smartphone's location services or a web mapping service, mapping service application and/or mapping API to determine the new location coordinates for where the user has placed the icon and utilizes these as the location coordinates to be transferred to power management device 200. In that way a user can manually fine tune the location coordinates that they wish to associate with a power management device 200.

It may become apparent that the location of power management device 200 was not loaded during installation, or that the location of a power management device 200 has changed since being originally installed. In one preferred embodiment, where power management device 200 is in communication with service platform 500, a user through user interface 502 or the Product App may preferably transfer location coordinates to power management device 200 through service platform 500 using any communication path available. Possible communication pathways have been outlined in FIG. 4. In one preferred embodiment, the Product App or user interface 502 preferably allows a user to choose a location for power management device 200 on a map and using a web mapping service, mapping service application and/or mapping API, determines the location coordinates for the chosen location which are preferably transferred to power management device 200 through service platform 500.

It may be desirable for power management device 200 to vary a power control circuit based on sunrise or sunset. In one preferred embodiment, power management device 200 is preferably programmed with an astronomical algorithm that can compute the time of sunrise and sunset for a given geographic location and a known reference of time and date. System microcontroller 208 is preferably configured to compute a time for sunrise and/or sunset algorithmically utilizing the location coordinates stored in memory in combination with the date and time reported by perpetual clock calendar 204 and, where configured through the Product App, vary power control circuits, such as relay 216 or relay 218, in accordance with the time calculated for sunrise and sunset. The Product App is preferably configured so that a user can choose to enter an offset of an added or reduced chosen number of minutes, that offset being transferred to power management device 200 and utilized by system microcontroller 208 to advance or delay a switching operation from the time calculated for sunrise or sunset, thereby allowing the user to effectively choose a constant ambient light level without using an ambient light level detector.

The foregoing description on location determination is not limited to power management devices and can be applied to a range of appliances or devices where location reporting is desirable. Examples include, but are not limited to: door mechanisms; garage door mechanism; gate mechanisms; lighting systems; lights; lighting fixtures; lamps; luminaries; motorized curtains, blinds, awnings and movie screens; vending machines; heat exchangers; pool filtration systems; pumps; irrigation devices that regulate the flow of water; sprinkler systems; electric motors; heating, ventilation and air-conditioning systems; thermostats; ceiling fans; security and alarm systems; sensors; hot water boilers; video and still cameras; gas metering and control equipment; electricity meters; home entertainment and musical systems; consumer electronics; robotics; surveillance systems; door locks; refrigerators; freezers; domestic appliances; industrial appliances; electric motors; and whitegoods.

Figure 8:
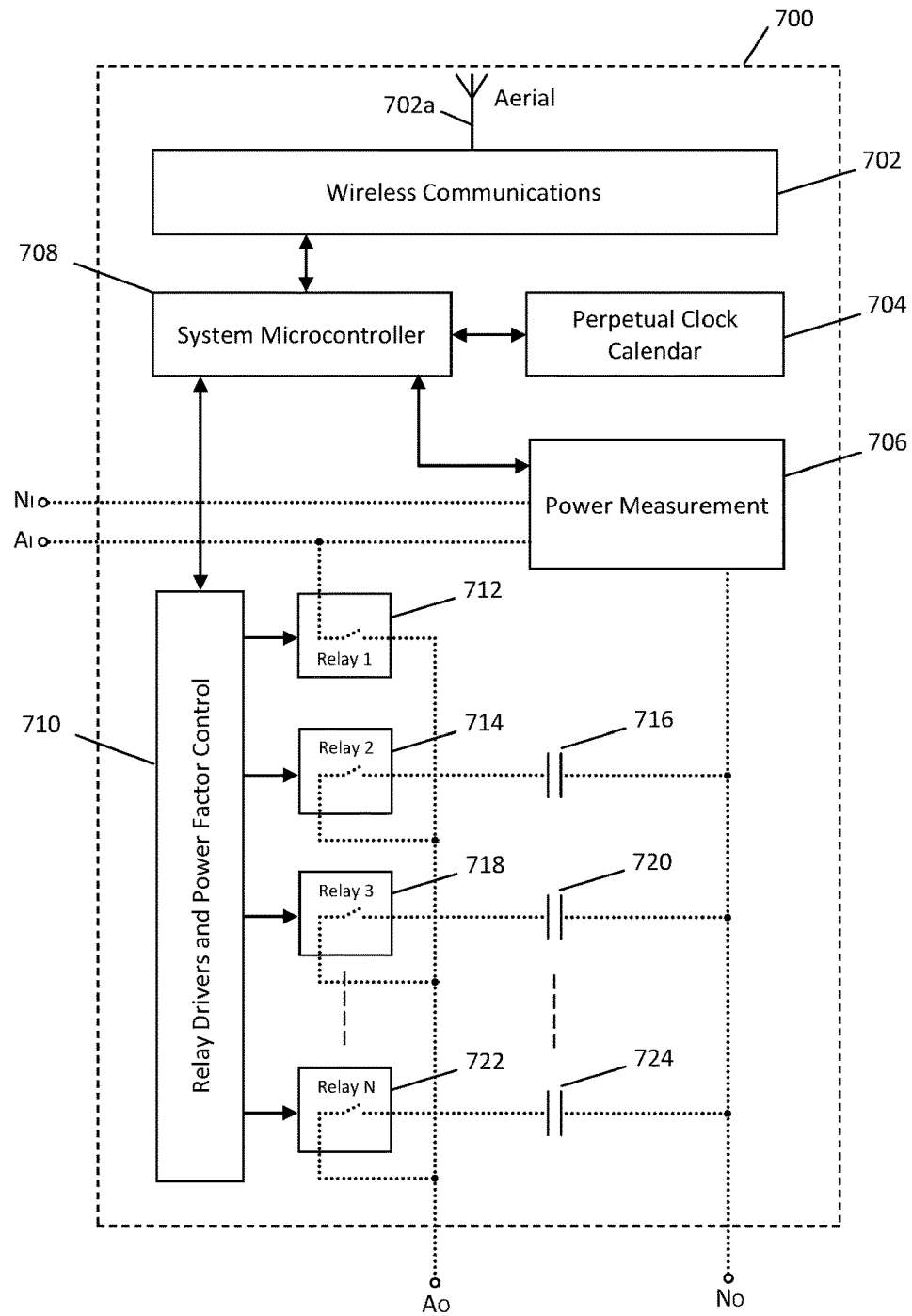
FIG. 8 is a block diagram of the functional elements of a power management device in accordance with an additional preferred embodiment of the present disclosure.

The power measurement capabilities of power management device 200 preferably enable it to measure the power factor of an appliance or device. It can be appreciated that for applications where the power factor is less than unity, it may be highly advantageous to provide power factor correction. Referring now to FIG. 8, a power management device 700 is shown. Power management device 700 is similar to power management device 200 except that power management device 700 includes power factor correction circuitry and components. Power management device 700 preferably includes wireless communications 702, wireless communications aerial(s) 702a, perpetual clock calendar circuit 704, power measurement 706, system microcontroller 708, relay drivers and power factor control circuit 710, relays 1 to N (shown in FIG. 8 as relays 712, 714, 718, and 722, respectively), capacitor 716, capacitor 720, through to capacitor 724. Wireless communications 702 can be configured with any of the wireless communication elements, components and capabilities outlined for power management device 200 which may include one or more aerials 702a in support of the chosen wireless communications and has been depicted in FIG. 8 as a single functional element for conciseness only. The power switching functions of relays 712, 714, 718, and 722 can be performed by any suitable power switching technologies including any power switching technologies outlined earlier in relation to the power control circuits in power management device 200.

The power factor correction may be achieved by applying a capacitive load across Ao and No in parallel with an inductive load causing the power factor measured at Ai and Ni to increase toward unity. The amount of capacitance required across Ao and No depends on how far the measured power factory is away from unity and is specific to an inductive load. In one preferred embodiment, power management device 700 is preferably configured with a one or more capacitors, such as capacitors 716, 720 through to 724. Where more than one capacitor is utilized, each capacitor may preferably adopt any mix of capacitance and may be constant, for example 1 uF each, may increase incrementally, for example 1 uF, 2 uF, 3 uF, etc, may increase binary, for example 1 uF, 2 uF, 4 uF, etc, or may increase according to an algorithm. While not shown, more than one capacitor may be used to create a capacitive load controlled by a single relay.

Power measurement circuitry 706, under the control of system microcontroller 708, is preferably configured to measure the power metrics of a load connected to the power outputs Ao and No. A load connected between Ao and No is preferably activated when relay 712 is closed. Where a load is inductive, such as an electric motor, power measurement 706 is preferably configured to report the measured power factor to system microcontroller 708, or system microcontroller 708 calculates the power factor from the power metrics measured and reported by power measurement 706. With a known power factor, system microcontroller 708 is preferably configured to calculate the capacitive reactance required to increase the power factor as close to unity as can be achieved through a mix of installed capacitors. System microcontroller 708 preferably commands relay drivers and power factor control 710 to switch one or more relays bringing one or more capacitors into the circuit as required. While the circuit is active, power measurement 706 preferably continually monitors the power metrics of a load, allowing system microcontroller 708 to dynamically vary the power factor correction as the load changes so that an optimum power factor can be maintained over time. Such functionality cannot be readily achieved with a fixed power factor correction system. Where power to a load is to be terminated, system microcontroller 708 preferably commands relay drivers and power factor control circuit 710 to switch all power factor capacitors out of the circuit prior to causing relay 712 to terminate power.

In one preferred embodiment, power factor correction may be configured as a standalone device external to power management device 200, but functionally coupled through a wireless or hardwired connection, allowing system microcontroller 208 to control relay drivers and power factor control circuit 710 for the switching of capacitance as required. A standalone power factor corrector may preferably take the form of relay drivers and power factor control 710 with one or more relays, such as relays 714, 718 through to 722, and one or more capacitors, such as capacitors 716, 720 through to 724. It can be appreciated that wireless communications may be added to a standalone power factor corrector to facilitate wireless communications with a power management device 200 or service platform 500. It can be appreciated it may be necessary for a standalone power factor corrector to include a microcontroller to manage system, functional and communication capabilities.

Where power factor correction is configured external to power management device 200, power management device 200 may preferably report to a microcontroller in the power factor corrector a power factor value or power measurements allowing the power factor corrector microcontroller to calculate a power factor value, thereby allowing the power factor corrector microcontroller to switch in the necessary capacitance to adjust the power factor as close to unity as can be achieved through a mix of installed capacitors.

In one preferred embodiment features outlined for the Product App may be split over different configurations of the Product App. By way of example, an installer may have one version of the Product App configured for installing a power management device 200 while a user many have another version of the Product App configured for operating a power management device 200, thereby allowing for a number of different technical support and service architectures in combination with data reporting capabilities of power management device 200. Examples of Product App configurations, technical support and data exchange features that may be incorporated into a power management device 200 and service platform are described in more detail in PCT Application No. PCT/AU2013/001231 filed Oct. 23, 2013, titled "System and Method for Exchanging Support Data with a Device Having No Physical User Interface", the entire contents of which being incorporated herein by reference. Where desirable, smartphone 10, the Product App or service platform 500 may include voice recognition that analyzes the digital representation of an analog voice command to determine and implement the required function spoken by a user.

Aspects of the present disclosure may be used in a variety of environments. For example only, the disclosure can be adapted for use with gas meters (e.g., natural gas) water meters, electricity meters and home-generated electrical apparatuses such as a PV solar system and/or wind turbine, inverters and battery storage systems, including battery storage systems in electric cars functionally coupled to a home electricity network.

The features described with respect to one embodiment may be applied to other embodiments, or combined with, or interchanged with, the features of other embodiments without departing from the scope of the present invention.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. An electromechanical relay switching system for reducing electromagnetic interference and radio frequency interference, the system comprising:
    at least one electromechanical relay having an energizeable coil configured to close said relay;
    a power measurement circuit configured to measure voltage; and a microcontroller having a non-volatile memory, said microcontroller being configured to determine a voltage zero crossing time based on the voltage measured by said power measurement circuit, said microcontroller being configured to synchronize energizing said coil compared to the voltage zero crossing time based on a relay contact close time as measured particularly for said relay, and based on a relay contact bounce time as measured particularly for said relay, said microcontroller being configured to commence energizing said relay after a lead time has elapsed since the voltage zero crossing time, where if the measured close time is less than a half-period of the measured voltage, then the lead time being determined by subtracting from the half-period of the measured voltage a difference between the measured close time and half the measured bounce time; otherwise if the measured close time is greater than the half-period of the measured voltage, then the lead time being determined by subtracting from a full period of the measured voltage a difference between the measured close time and half the measured bounce time.

2. The electromechanical relay switching system of claim 1, wherein said power measurement circuit is further configured to measure current, said microcontroller being configured determine a current zero crossing time based on the current measured by said power measurement circuit.

3. The electromechanical relay switching system of claim 1, further comprising a second relay, said relay and said second relay both being normally open contact relays.

4. The electromechanical relay switching system of claim 1, further comprising a second relay, said relay being a normally open relay, said second relay being a normally closed relay.

5. The electromechanical relay switching system of claim 3, wherein said microcontroller is configured to independently control said first relay and said second relay.

6. The electromechanical relay switching system of claim 1, wherein said non-volatile memory is configured to store the measured relay contact close time and the relay contact bounce time.

7. A method for energizing an electromechanical relay with reduced electromagnetic interference and radio frequency interference, the method comprising:
    measuring a contact close time, and a contact bounce time, each of the measurements being particular to the relay;
    storing the measured contact close time and the measured contact bounce time in a memory operatively connected to a microcontroller configured to energize the relay;
    measuring a voltage in a circuit containing the relay;
    determining a voltage zero crossing time based on the measured voltage; and
    energizing the relay based on the measured contact close time, the measured contact bounce time, and the voltage zero crossing time, the energizing of the relay being commenced after a lead time has elapsed since the voltage zero crossing time, where if the measured close time is less than a half-period of the measured voltage, then the lead time being determined by subtracting from the half-period of the measured voltage a difference between the measured close time and half the measured bounce time; otherwise if the measured close time is greater than the half-period of the measured voltage, then the lead time being determined by subtracting from a full period of the measured voltage a difference between the measured close time and half the measured bounce time.

8. The method of claim 7, wherein the measuring of the contact close time and the contact bounce time is determined prior to installation of the relay in equipment.

9. The method of claim 7, wherein the measuring of the contact close time and the contact bounce time is conducted after the relay is assembled in circuit.

10. The method of claim 7, further comprising measuring a current in the circuit containing the relay, and determining a current zero crossing time based on the measured current.

* * * * *